United States Patent
Yadid-Pecht et al.

(10) Patent No.: US 10,922,796 B2
(45) Date of Patent: Feb. 16, 2021

(54) METHOD OF PRESENTING WIDE DYNAMIC RANGE IMAGES AND A SYSTEM EMPLOYING SAME

(71) Applicant: UTI LIMITED PARTNERSHIP, Calgary (CA)

(72) Inventors: Orly Yadid-Pecht, Calgary (CA); Jie Yang, Calgary (CA); Alain Hore, Calgary (CA); Ulian Shahnovich, Calgary (CA)

(73) Assignee: TONETECH INC., Calgary (CA)

( * ) Notice: Subject to any disclaimer, the term of this patent is extended or adjusted under 35 U.S.C. 154(b) by 26 days.

(21) Appl. No.: 16/317,438

(22) PCT Filed: Jul. 11, 2017

(86) PCT No.: PCT/CA2017/050842
§ 371 (c)(1),
(2) Date: Jan. 11, 2019

(87) PCT Pub. No.: WO2018/010026
PCT Pub. Date: Jan. 18, 2018

(65) Prior Publication Data
US 2019/0295229 A1    Sep. 26, 2019

Related U.S. Application Data

(60) Provisional application No. 62/360,771, filed on Jul. 11, 2016.

(51) Int. Cl.
*G06T 5/00* (2006.01)
*G06T 7/10* (2017.01)
(Continued)

(52) U.S. Cl.
CPC ............ *G06T 5/008* (2013.01); *G06F 1/0307* (2013.01); *G06T 3/0093* (2013.01); *G06T 5/00* (2013.01);
(Continued)

(58) Field of Classification Search
CPC .. G06T 5/008; G06T 5/00; G06T 7/10; G06T 3/0093; G06T 5/50; H04N 5/20; H04N 5/2355; H04N 5/23229; G06F 1/0307
See application file for complete search history.

(56) References Cited

U.S. PATENT DOCUMENTS 5,991,456 A    11/1999    Rahman et al.
9,501,818 B2 *  11/2016    Ward ..................... G06T 5/40
(Continued)

FOREIGN PATENT DOCUMENTS

WO    2014025588 A1    2/2014

OTHER PUBLICATIONS

ISA/CA Canadian Intellectual Property Office—International Search Report and Written Opinion of the International Searching Authority for PCT international application No. PCT/CA2017/050842 Filed Jul. 11, 2017.

*Primary Examiner* — Yon J Couso
(74) *Attorney, Agent, or Firm* — Daniel Polonenko

(57) ABSTRACT

A method of converting a wide dynamic range (WDR) image to a low dynamic range (LDR) image have the steps of: (i) obtaining a transfer function that has a plurality of sub-functions, each sub-function corresponding to a non-overlapped input interval of the dynamic range of the WDR image; (ii) determining the intensity of each pixel of the LDR image by using the transfer function and at least the intensity value of the corresponding pixel of the WDR image; and (iii) outputting the LDR image.

20 Claims, 9 Drawing Sheets

(51) Int. Cl.
  *G06F 1/03* (2006.01)
  *G06T 3/00* (2006.01)
  *G06T 5/50* (2006.01)
  *H04N 5/20* (2006.01)
  *H04N 5/235* (2006.01)
  *H04N 5/232* (2006.01)

(52) U.S. Cl.
  CPC .................. *G06T 5/50* (2013.01); *G06T 7/10* (2017.01); *H04N 5/20* (2013.01); *H04N 5/2355* (2013.01); *H04N 5/23229* (2013.01)

(56) References Cited

U.S. PATENT DOCUMENTS

2004/0213478 A1    10/2004  Chesnokov
2007/0269132 A1*   11/2007  Duan ........................ G06T 5/40
                                                            382/274
2008/0317358 A1    12/2008  Bressan et al.
2010/0226547 A1     9/2010  Criminisi et al.
2011/0188744 A1*    8/2011  Sun ..................... H04N 5/2355
                                                            382/162

\* cited by examiner

METHOD OF PRESENTING WIDE DYNAMIC RANGE IMAGES AND A SYSTEM EMPLOYING SAME

CROSS-REFERENCE TO RELATED APPLICATIONS

This application claims the benefit of U.S. Provisional Patent Application Ser. No. 62/360,771, filed Jul. 11, 2016, the content of which is incorporated herein by reference in its entirety.

TECHNICAL FIELD

The present disclosure relates generally to image processing. More specifically, this disclosure pertains to a system and method for presenting wide dynamic range (WDR) images on a low dynamic range (LDR) presentation device.

BACKGROUND

Dynamic range may be defined as the ratio of the intensity of the brightest point to the intensity of the darkest point in a scene, an image, or an imaging device. For natural scenes, this ratio can be of the order of millions. In order to better capture and reproduce the wide dynamic range in the real world, wide dynamic range (WDR) images, also called high dynamic range (HDR) images, are introduced. A WDR image is an image that exhibits a large dynamic range. To create a WDR image, several shots of the same scene at different exposures can be taken, and dedicated image processing program using sophisticated multiple exposure fusion techniques can be used to combine the several shots for creating a WDR image. Such a dedicated image processing program may be a software program or alternatively a firmware program. For example, many CMOS sensors have already embedded WDR or HDR capabilities, and some recent digital cameras have embedded the WDR or HDR functionality in its firmware to automatically generate WDR images in the camera itself. However, currently available presentation devices, such as printers, monitors (e.g., CRT, LCD and light-emitting diode (LED) monitors), projectors, and the like, have a limited or low dynamic range. Consequently, presenting a WDR image on such presentation devices will either be over-exposed in the bright areas or under-exposed in the dark areas, and details will be lost. Thus, there is a need to compress the dynamic range of a WDR image to adapt to today's presentation devices which may have a lower dynamic range. Tone mapping algorithms perform this compression/adaptation of the dynamic range. However, the computation of these algorithms can be power and time consuming. Therefore, it may be difficult to implement tone mapping algorithms on a power-constrained system-on-chip (SoC) or embedded system that calls for power and real-time performance.

CMOS image sensors are the most commonly used WDR image capture devices. However, ordinary CMOS image sensors need multiple exposure fusion captures in order to provide a WDR representation, which is time and power consuming.

Tone mapping algorithms can be classified into two categories: global and local tone mapping operators. A global operator has a single transfer function for any WDR image. Once the transfer function has been established, the input pixels with the same intensity are mapped to the same output intensity, without consideration of surrounding pixels in the image. The transfer functions are usually monotonic thus avoiding "halo" artifacts. Global tone mapping algorithms are simple and fast since the transfer function can be implemented as a look-up table. One of the most successful global tone mapping algorithms at present is based on an adaptive logarithmic mapping strategy to display WDR images (Drago et al., 2003, *Adaptive logarithmic mapping for displaying high contrast scenes*. Computer Graphics Forum 22(3): 419-426). The algorithm changes the base of logarithmic function based on the luminance level. Another approach to global tone mapping algorithm is based on four user parameters directly inspired by photoreceptor physiology (Reinhard et al., 2005, *Dynamic range reduction inspired by photoreceptor physiology*. IEEE Transactions on Visualization and Computer Graphics 11(1): 13-24). In general, global tone mapping algorithms tend to lose contrast and details during compression.

Local tone mapping algorithms compress each pixel according to its luminance value as well as to the luminance values of a set of neighboring pixels to better preserve details and local contrast. However, this preservation is done at the expense of higher computation complexity and memory cost. Classic problems to be solved by local tone mapping algorithms are to determine how many neighboring pixels need to be included in the computation, and how to weigh each neighboring pixel's contribution. Moreover, local tone mapping can cause "halo" artifacts (Ofili et al., 2013, *Hardware implementation of an automatic rendering tone mapping algorithm for wide dynamic range display*. J. Low Power Electr. Appl. 3 (4): 337-367). Computation in some local tone mapping algorithms are heavy in terms of logic and memory resource usage (Reinhard et al., 2002, *Photographic tone reproduction for digital images*. ACM Trans. Graph. 21(3): 267-276).

SUMMARY

The embodiments of the present disclosure relate to image processing methods for converting wide dynamic range (WDR) images for adapting to a low dynamic range (LDR) display. A mantissa-exponent format is used for representing WDR images and a tone mapping method is used for processing such WDR images. In some embodiments, the mantissa-exponent format may be a fixed-point mantissa-exponent format. In some alternative embodiments, the mantissa-exponent format may be a floating-point mantissa-exponent format.

According to one aspect of this disclosure, there is provided a method for representing WDR images in mantissa-exponent format and a tone mapping method that can convert the mantissa-exponent-formatted WDR image to a LDR image for presenting on a LDR presentation device. The mantissa-exponent format representation reduce both memory space and computational complexity. The tone mapping method takes advantage of the mantissa-exponent representation and can efficiently map a WDR image to a LDR image.

In some embodiments, the methods comprise a first step for representing WDR images in mantissa-exponent format and a second step for conversion of the mantissa-exponent-formatted WDR image to a LDR image for outputting to a LDR presentation device.

In some embodiments, a WDR image is obtained through a WDR image source or with a WDR capture device such as a WDR image sensor. In some other embodiments, a WDR image is obtained by merging multiple images captured with different exposures. A mantissa-exponent representation of the WDR source/capture is then generated. Then, the tone mapping method maps the mantissa-exponent representation of the WDR image into a LDR image. During the tone mapping process, multiple contrast enhancement techniques can be incorporated in order to increase the contrast of the finial output LDR image.

According to one aspect of this disclosure, there is provided a method of converting an input wide dynamic range (WDR) image into an output low dynamic range (LDR) image, the pixels of the input WDR image having a first dynamic range $R_{WDR}$ and the pixels of the output LDR image having a second dynamic range $R_{LDR}$ smaller than the first dynamic range. The method comprises: obtaining a transfer function $f(x)$ over the first dynamic range $R_{WDR}$ with x being an intensity value within the first range $R_{WDR}$, the transfer function $f(x)$ comprising a plurality of sub-functions $f_i(x)$ with i being an integer and i≥0, each sub-function $f_i(x)$ being determined over an input interval $X_i$ of the first dynamic range $R_{WDR}$, and the input intervals $X_i$ being non-overlapped and spanning the first dynamic range $R_{WDR}$; determining the intensity y(p) of each pixel p of the output LDR image by using the transfer function $f(x)$ and at least the intensity value x(p) of the corresponding pixel p of the input WDR image; and outputting the output LDR image.

In some embodiments, the plurality of sub-functions $f_i(x)$ are different mathematical functions.

In some embodiments, the plurality of sub-functions $f_i(x)$ are a same mathematical function with different parameters.

In some embodiments, the intensity values x within the first range $R_{WDR}$ are represented by at least a coarse layer and a detailed layer, and said non-overlapped input intervals of the first dynamic range $R_{WDR}$ are partitioned based on at least the coarse layer.

In some embodiments, said non-overlapped input intervals of the first dynamic range $R_{WDR}$ are partitioned based on at least the coarse layer and the detailed layer.

In some embodiments, said non-overlapped input intervals of the first dynamic range $R_{WDR}$ are partitioned based on at least the coarse layer, the detailed layer, and a pixel intensity distribution.

In some embodiments, said pixel intensity distribution is the pixel intensity distribution of the input WDR image.

In some embodiments, said pixel intensity distribution is the pixel intensity distribution of a set of WDR images.

In some embodiments, the set of WDR images are a same type of images.

In some embodiments, the intensity values x within the first range $R_{WDR}$ are represented as $x=m \times r^s$ with m being the mantissa of x, r being a radix, s being the exponent of x, and × representing multiplication. The mantissa m is the detailed layer and the exponent x is the coarse layer.

In some embodiments, said obtaining the transfer function $f(x)$ comprises: maintaining a lookup table of the transfer function $f(x)$. Said lookup table comprises a plurality of entries, each entry comprises a value of x represented as its mantissa m and exponents, and the corresponding value of $f(x)$. Said determining the intensity y(p) of each pixel p of the output LDR image comprises: representing the intensity value x(p) of the pixel p of the input WDR image in the mantissa-exponent form:

$$x(p)=m(p) \times r^{s(p)}; \tag{1}$$

searching the lookup table using s(p) and m(p) for determining the corresponding value of $f(x(p))$; and using the determined value of $f(x(p))$ as the intensity value of the pixel p of the output LDR image.

In some embodiments, the transfer function $f(x)$ is:

$$f(x)=\log_2(x+1). \tag{2}$$

In some embodiments, the transfer function $f(x)$ is:

$$f(x)=\log_2(a_s \times x+b_s)+c_s. \tag{3}$$

where $a_s$, $b_s$ and $c_s$ are parameters.

In some embodiments, the transfer function $f(x)$ is:

$$f(x)=(\log_2(a_s \times x+b_s)+c_s) \times \log_2(g(m,s)) \times d_p+k_p, \tag{4}$$

where $a_s$, $b_s$, $c_s$, $d_p$, and $k_p$ are parameters, and the function g(m,s) is a function of mantissa m and exponent s.

In some embodiments, r is the natural base e and m=1.

In some embodiments, r=2, and m and s are integers greater than or equal to zero.

In some embodiments, said non-overlapped interval $X_i$ is:

$$X_i=\{m_{MIN} \times r^i \leq x \leq m_{MAX} \times r^i\}, \tag{5}$$

where $m_{MIN}$ and $m_{MAX}$ are the minimum and maximum of m, respectively.

In some embodiments, said non-overlapped input intervals of the first dynamic range $R_{WDR}$ are partitioned based on at least the coarse layer and a weighted combination D of a reference pixel intensity distribution and an input pixel intensity distribution:

$$D=\alpha \times D_{ref}+\beta \times D_{hist}, \tag{6}$$

where α and β are weight factors and α+β=1; $D_{ref}$ is the reference pixel intensity distribution; and $D_{hist}$ is the input pixel intensity distribution.

In some embodiments, the input pixel intensity distribution $D_{hist}$ is a pixel intensity distribution of the input WDR image.

In some embodiments, the input pixel intensity distribution $D_{hist}$ is a pixel intensity distribution of a set of WDR images.

In some embodiments, r=2, and m and s are integers greater than or equal to zero; wherein D=D(s), $D_{ref}=D_{ref}(s)$, $D_{hist}=D_{hist}(S)$ are functions of s. The first pixel intensity range $R_{WDR}$ is between zero and a maximum value $m_{MAX}$, and the second pixel intensity range $R_{LDR}$ is between zero and a maximum value $y_{MAX}$. The transfer function $f(x)$ is:

$$f(x) = (\log_2(x+1)) \times \log_2\left(\frac{2 \times m}{m_{MAX}} + s + 2\right) \times d_p + k_p, \tag{7}$$

where $d_p$ and $k_p$ are parameters which are the solutions of functions:

$$f(p_{lowbound})=y_{MAX} \times D(s), \tag{8}$$

$$f(p_{highbound})=y_{MAX} \times D(s+1), \tag{9}$$

where $$p_{lowbound}=m_{MAX} \times 2^s, \tag{10}$$

$$p_{highbound}=m_{MAX} \times 2^{s+1}-1. \tag{11}$$

In some embodiments, the method further comprises: establishing a plurality of WDR image classes; and establishing a plurality of transfer functions each for one of the plurality of WDR image classes. Said obtaining the transfer function $f(x)$ comprises: determining one of the plurality of WDR image classes for the input WDR image; and determining the transfer function $f(x)$ as one of the plurality of transfer functions based on the determined WDR image class.

According to one aspect of this disclosure, there is provided a method of converting an input WDR image into an output LDR image, the pixels of the input WDR image having a first dynamic range $R_{WDR}$ and the pixels of the output LDR image having a second dynamic range $R_{LDR}$ smaller than the first dynamic range. The method comprises: partitioning the input WDR image into a plurality of WDR image blocks; for each WDR image block, using a method described above to convert the WDR image block into a LDR image block; and combining the obtained LDR image blocks to form the output LDR image.

According to one aspect of this disclosure, there is provided a method of converting an input WDR image to an output LDR image, the pixels of the input WDR image having a first dynamic range $R_{WDR}$ and the pixels of the output LDR image having a second dynamic range $R_{LDR}$ smaller than the first dynamic range. The method comprises: generating a plurality of intermediate LDR images from the input WDR image, the generation of each intermediate LDR image using a corresponding window, at least a subset of the windows having different sizes; and fusing the plurality of intermediate LDR images to obtain the output LDR image. Said generating the plurality of intermediate LDR images comprises: in generating each intermediate LDR image, (1) at least partially overlapping the corresponding window with the input WDR image at a first position thereof to obtain a WDR image block; (2) using a method described above to convert the WDR image block into a LDR image block, said LDR image block being converted from at least one subset of the pixels of the WDR image block; (3) set the first position as a next position of the input WDR image, and repeating steps (1) and (2) until all pixels of the input WDR image have been converted; and (4) combining the obtained LDR image blocks to form the intermediate LDR image.

In some embodiments, said at least one subset of the pixels of the WDR image block only comprises one pixel of the WDR image block.

In some embodiments, said fusing the plurality of intermediate LDR images to obtain the output LDR image comprises: for each pixel p of the output LDR image, calculating the intensity y(p) thereof as:

$$y(p) = \frac{\sum_{i=1}^{K} a_i(p) y_i(p)}{\sum_{i=1}^{K} a_i(p)}, \qquad (12)$$

where $y_i(p)$ is the pixel intensity value of the pixel p of the i-th intermediate LDR image, $a_i(p)$ is a weighting factor for the pixel p of the i-th intermediate LDR image, and K is the number of the intermediate LDR images.

In some embodiments, said fusing the plurality of intermediate LDR images to obtain the output LDR image further comprises: calculating $a_i(p)$ as:

$$a_i(p) = \frac{\sigma_i(p)}{\sigma_i(p) + \varepsilon}, \qquad (13)$$

where $\sigma_i(p)$ is the pixel intensity variance of the WDR image block used for determining the transfer function for calculating the intensity of the pixel p of the i-th intermediate LDR image, and $\varepsilon$ is a parameter.

According to one aspect of this disclosure, there is provided a method of converting an input WDR image to an output LDR image, the pixels of the input WDR image having a first dynamic range $R_{WDR}$ and the pixels of the output LDR image having a second dynamic range $R_{LDR}$ smaller than the first dynamic range. The method comprises: generating a plurality of intermediate LDR images from the input WDR image, the generation of each intermediate LDR image using a corresponding window, at least a subset of the windows having different sizes; and fusing the plurality of intermediate LDR images to obtain the output LDR image. Said generating the plurality of intermediate LDR images comprises: in generating each intermediate LDR image, (1) at least partially overlapping the corresponding window with the input WDR image at a first position thereof to obtain a WDR image block; (2) obtaining a transfer function $f(x)$, x being an intensity value, for the WDR image block based on at least the pixel intensity distribution of the WDR image block; (3) applying the obtained transfer function $f(x)$ to one or more pixels of the WDR image block to obtain a LDR image block as:

$$y(p) = f(x(P)), \qquad (14)$$

where x(p) is the intensity of a pixel of the one or more pixels of the WDR image block, and y(p) is the intensity of a pixel of the LDR image block; (4) set the first position as a next position of the input WDR image, and repeating steps (1) and (2) until all pixels of the input WDR image have been converted; and (5) combining the obtained LDR image blocks to form the intermediate LDR image.

In some embodiments, said fusing the plurality of intermediate LDR images to obtain the output LDR image comprises: for each pixel p of the output LDR image, calculating the intensity y(p) thereof as:

$$y(p) = \frac{\sum_{i=1}^{K} a_i(p) y_i(p)}{\sum_{i=1}^{K} a_i(p)}, \qquad (15)$$

where $y_i(p)$ is the pixel intensity value of the pixel p of the i-th intermediate LDR image, $a_i(p)$ is a weighting factor for the pixel p of the i-th intermediate LDR image, and K is the number of the intermediate LDR images.

In some embodiments, said fusing the plurality of intermediate LDR images to obtain the LDR image further comprises: calculating $a_i(p)$ as:

$$a_i(p) = \frac{\sigma_i(p)}{\sigma_i(p) + \varepsilon}, \qquad (16)$$

where $\sigma_i(p)$ is the pixel intensity variance of the WDR image block used for determining the transfer function for calculating the intensity of the pixel p of the i-th intermediate LDR image, and $\varepsilon$ is a parameter.

In some embodiments, the smallest size of the windows is 32-by-32 pixels.

In some embodiments, the largest size of the windows equals to the size of the input WDR image.

In some embodiments, the above-described methods further comprise: filtering the output LDR image.

In some embodiments, said filtering the output LDR image comprises: filtering the output LDR image as:

$$t(p) = |q(p) + (q(p) - (q*l)(p))| = |2 \times q(p) - (q*l)(q*l)|, \qquad (17)$$

where t(p) is the filtered LDR image, q(p) is the output LDR image, l(p) is a low-pass filter, and symbol * denotes the convolution operation.

According to one aspect of this disclosure, there is provided a system for converting an input WDR image into an output LDR image, the pixels of the input WDR image having a first dynamic range $R_{WDR}$ and the pixels of the output LDR image having a second dynamic range $R_{LDR}$ smaller than the first dynamic range. The system comprises: an input for inputting the input WDR image; an output for outputting the output LDR image; and a processing structure functionally coupled to the input and the output. The processing structure acts for: obtaining a transfer function $f(x)$ over the first dynamic range $R_{WDR}$ with x being an intensity value within the first range $R_{WDR}$, the transfer function $f(x)$ comprising a plurality of sub-functions $f_i(x)$ with i being an integer and i≥0, each sub-function $f_i(x)$ being determined over an input interval $X_i$ of the first dynamic range $R_{WDR}$, and the input intervals $X_i$ being non-overlapped and spanning the first dynamic range $R_{WDR}$; determining the intensity y(p) of each pixel p of the output LDR image by using the transfer function $f(x)$ and at least the intensity value x(p) of the corresponding pixel p of the input WDR image; and outputting the output LDR image.

According to one aspect of this disclosure, there is provided a system of converting an input WDR image into an output LDR image, the pixels of the input WDR image having a first dynamic range $R_{WDR}$ and the pixels of the output LDR image having a second dynamic range $R_{LDR}$ smaller than the first dynamic range. The system comprises: an input for inputting the input WDR image; an output for outputting the output LDR image; and a processing structure functionally coupled to the input and the output. The processing structure acts for: partitioning the input WDR image into a plurality of WDR image blocks; for each WDR image block, using the above-described method to convert the WDR image block into a LDR image block; and combining the obtained LDR image blocks to form the output LDR image.

According to one aspect of this disclosure, there is provided a system of converting an input WDR image to an output LDR image, the pixels of the input WDR image having a first dynamic range $R_{WDR}$ and the pixels of the output LDR image having a second dynamic range $R_{LDR}$ smaller than the first dynamic range. The system comprises: an input for inputting the input WDR image; an output for outputting the output LDR image; and a processing structure functionally coupled to the input and the output. The processing structure acts for: generating a plurality of intermediate LDR images from the input WDR image, the generation of each intermediate LDR image using a corresponding window, at least a subset of the windows having different sizes; and fusing the plurality of intermediate LDR images to obtain the output LDR image. Said generating the plurality of intermediate LDR images comprises: in generating each intermediate LDR image, (1) at least partially overlapping the corresponding window with the input WDR image at a first position thereof to obtain a WDR image block; (2) using the above-described method to convert the WDR image block into a LDR image block, said LDR image block being converted from at least one subset of the pixels of the WDR image block; (3) set the first position as a next position of the input WDR image, and repeating steps (1) and (2) until all pixels of the input WDR image have been converted; and (4) combining the obtained LDR image blocks to form the intermediate LDR image.

According to one aspect of this disclosure, there is provided a system of converting an input WDR image to an output LDR image, the pixels of the input WDR image having a first dynamic range $R_{WDR}$ and the pixels of the output LDR image having a second dynamic range $R_{LDR}$ smaller than the first dynamic range. The system comprises: an input for inputting the input WDR image; an output for outputting the output LDR image; and a processing structure functionally coupled to the input and the output. The processing structure acts for: generating a plurality of intermediate LDR images from the input WDR image, the generation of each intermediate LDR image using a corresponding window, at least a subset of the windows having different sizes; and fusing the plurality of intermediate LDR images to obtain the output LDR image. Said generating the plurality of intermediate LDR images comprises: in generating each intermediate LDR image, (1) at least partially overlapping the corresponding window with the input WDR image at a first position thereof to obtain a WDR image block; (2) obtaining a transfer function $f(x)$, x being an intensity value, for the WDR image block based on at least the pixel intensity distribution of the WDR image block; (3) applying the obtained transfer function $f(x)$ to one or more pixels of the WDR image block to obtain a LDR image block as:

$$y(p)=f(x(p)), \qquad (18)$$

where x(p) is the intensity of a pixel of the one or more pixels of the WDR image block, and y(p) is the intensity of a pixel of the LDR image block; (4) set the first position as a next position of the input WDR image, and repeating steps (1) to (3) until all pixels of the input WDR image have been converted; and (5) combining the obtained LDR image blocks to form the intermediate LDR image.

According to one aspect of this disclosure, there is provided a computer-readable storage device comprising computer-executable instructions for converting an input WDR image to an output LDR image, the pixels of the input WDR image having a first dynamic range $R_{WDR}$ and the pixels of the output LDR image having a second dynamic range $R_{LDR}$ smaller than the first dynamic range. The instructions, when executed, cause a processing structure to act for: obtaining a transfer function $f(x)$ over the first dynamic range $R_{WDR}$ with x being an intensity value within the first range $R_{WDR}$, the transfer function $f(x)$ comprising a plurality of sub-functions $f_i(x)$ with i being an integer and i≥0, each sub-function $f_i(x)$ being determined over an input interval $X_i$ of the first dynamic range $R_{WDR}$, and the input intervals $X_i$ being non-overlapped and spanning the first dynamic range $R_{WDR}$; determining the intensity y(p) of each pixel p of the output LDR image by using the transfer function $f(x)$ and at least the intensity value x(p) of the corresponding pixel p of the input WDR image; and outputting the output LDR image.

According to one aspect of this disclosure, there is provided a computer-readable storage device comprising computer-executable instructions for converting an input WDR image into an output LDR image, the pixels of the input WDR image having a first dynamic range $R_{WDR}$ and the pixels of the output LDR image having a second dynamic range $R_{LDR}$ smaller than the first dynamic range. The instructions, when executed, cause a processing structure to act for: partitioning the input WDR image into a plurality of WDR image blocks; for each WDR image block, executing the above-described instructions to convert the WDR image block into a LDR image block; and combining the obtained LDR image blocks to form the output LDR image.

According to one aspect of this disclosure, there is provided a computer-readable storage device comprising computer-executable instructions for converting an input WDR image to an output LDR image, the pixels of the input WDR image having a first dynamic range $R_{WDR}$ and the pixels of the output LDR image having a second dynamic range $R_{LDR}$ smaller than the first dynamic range. The instructions, when executed, cause a processing structure to act for: generating a plurality of intermediate LDR images from the input WDR image, the generation of each intermediate LDR image using a corresponding window, at least a subset of the windows having different sizes; and fusing the plurality of intermediate LDR images to obtain the output LDR image. Said generating the plurality of intermediate LDR images comprises: in generating each intermediate LDR image, (1) at least partially overlapping the corresponding window with the input WDR image at a first position thereof to obtain a WDR image block; (2) executing the above-described instructions to convert the WDR image block into a LDR image block, said LDR image block being converted from at least one subset of the pixels of the WDR image block; (3) set the first position as a next position of the input WDR image, and repeating steps (1) and (2) until all pixels of the input WDR image have been converted; and (4) combining the obtained LDR image blocks to form the intermediate LDR image.

According to one aspect of this disclosure, there is provided a computer-readable storage device comprising computer-executable instructions for converting an input WDR image to an output LDR image, the pixels of the input WDR image having a first dynamic range $R_{WDR}$ and the pixels of the output LDR image having a second dynamic range $R_{LDR}$ smaller than the first dynamic range. The instructions, when executed, cause a processing structure to act for: generating a plurality of intermediate LDR images from the input WDR image, the generation of each intermediate LDR image using a corresponding window, at least a subset of the windows having different sizes; and fusing the plurality of intermediate LDR images to obtain the output LDR image. Said generating the plurality of intermediate LDR images comprises: in generating each intermediate LDR image, (1) at least partially overlapping the corresponding window with the input WDR image at a first position thereof to obtain a WDR image block; (2) obtaining a transfer function $f(x)$, x being an intensity value, for the WDR image block based on at least the pixel intensity distribution of the WDR image block; (3) applying the obtained transfer function $f(x)$ to one or more pixels of the WDR image block to obtain a LDR image block as:

$$y(p)=f(x(p)), \tag{19}$$

where $x(p)$ is the intensity of a pixel of the one or more pixels of the WDR image block, and $y(p)$ is the intensity of a pixel of the LDR image block; (4) set the first position as a next position of the input WDR image, and repeating steps (1) to (3) until all pixels of the input WDR image have been converted; and (5) combining the obtained LDR image blocks to form the intermediate LDR image.

BRIEF DESCRIPTION OF THE DRAWINGS

The present disclosure will be described in conjunction with reference to the following drawings in which:

FIG. 14 is an example showing the moving of the moving window shown in

FIG. 12; and

DETAILED DESCRIPTION

The embodiments of the present disclosure relate to image processing methods and systems for processing and converting wide dynamic range (WDR) images into low dynamic range (LDR) images suitable for presenting on presentation devices that do have sufficient dynamic range for properly displaying WDR images.

The methods and systems disclosed herein represent a WDR image in mantissa-exponent format and convert the mantissa-exponent-formatted WDR image to a LDR image for outputting. Herein, a WDR image is an image that exhibit a large dynamic range, and may be a still image, an image of a video stream, and/or the like. A WDR image may be in any suitable format such as RAW, Flexible Image Transport System (FITS), RGBE, Joint Photographic Experts Group (JPEG) such as JPEG-HDR, JPEG-XR and JPEG-XT, Tagged Image File Format (TIFF) such as Logluv TIFF, OpenEXR, and/or the like.

System Structure

Figure 1:
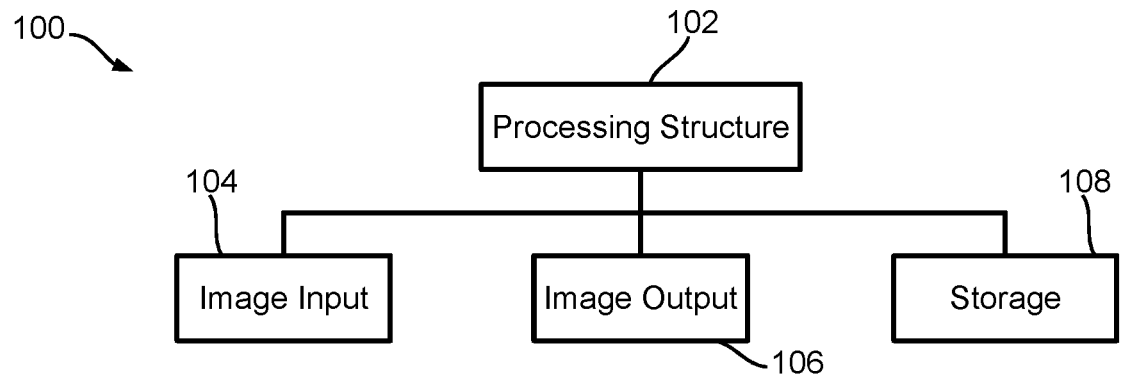
FIG. 1 is a schematic diagram showing the structure of an imaging processing system, according to some embodiments of the present disclosure.

Turning now the FIG. 1, an image processing system is shown and is generally identified using reference numeral 100. In various embodiments, the system 100 is for processing and converting one or more WDR images into one or more processed images suitable for presenting on a LDR presentation device. Such processed images are generally LDR images. The WDR images and LDR images may be in various forms in various embodiments.

The system 100 may be implemented in various forms. For example, in some embodiments, the system 100 may be a digital camera, a video recorder such as a camcorder, a web cam, a security camera, a presentation device (such as a printer, a monitor (e.g., a cathode ray tube (CRT), liquid crystal display (LCD) or LED monitor), a projector and the like), a smartphone, a tablet, a wearable electronic device, a laptop computer, a desktop computer, a computer network system, or the like.

In some other embodiments, the system 100 may be a component of another system or device, for example, an imaging component such as a camera module, an imaging processing component such as an imaging processing circuit coupled to a camera module for processing the image captured by the camera module, a display module coupled to a presentation device, or the like. Such a component may be used in various devices and system such as above mentioned digital camera, video recorder, web cam, security camera, presentation device, smartphone, tablet, wearable electronic device, laptop computer, desktop computer, computer network system, and the like.

As shown in FIG. 1, the system 100 comprises a processing structure 102 functionally coupled to an image input 104, an image output 106, and a storage 108 via suitable circuits such as a system bus, one or more printed circuit boards (PCB), and/or the like. The system 100 may also comprise other components (not shown) as needed, such as a keyboard, a computer mouse, a touch-sensitive screen, a speaker, a microphone controllers, wired or wireless network interface, sensors, servos, flash light, and the like.

The processing structure 102 is a computation structure for processing and converting one or more WDR images into one or more LDR images. In some embodiments, the processing structure 102 may be one or more single-core or multiple-core computing processors such as Intel® microprocessors offered by Intel Corporation of Santa Clara, Calif., USA, AMD® microprocessors offered by Advanced Micro Devices of Sunnyvale, Calif., USA, ARM® microprocessors manufactured by a variety of manufactures under the ARM® architecture developed by ARM Ltd. of Cambridge, UK, or the like.

In some alternative embodiments, the processing structure 102 may be one or more application-specific computation structures such as one or more application-specific integrated circuit (ASIC) chips, one or more field-programmable gate array (FPGA) chips, and/or the like, specifically designed with functions for processing and converting WDR images into LDR images.

In some embodiments, the processing structure 102 may comprise one or more "hard-wired" electrical or other suitable circuits for processing and converting WDR images into LDR images. In some alternative embodiments, the processing structure 102 may execute one or more software programs, software program modules, firmware programs, firmware program modules, and/or a combination thereof, for processing and converting WDR images into LDR images. Such programs and/or program modules may be stored in storage 108.

The image input 104 is one or more devices or components for inputting or capturing one or more WDR images into the system 100. For example, in some embodiments, the image input 104 may be an image sensor such as a complementary metal-oxide-semiconductor (CMOS) or a charge-coupled device (CCD) image sensor. In these embodiments, the WDR images may be the data generated by the image sensor that represents the captured WDR images.

In some alternative embodiments, the image input 104 may be a camera or camera module. In these embodiments, the WDR images may be the data generated by the camera or camera module that represents the captured WDR images.

In yet some alternative embodiments, the image input 104 may be a wired or wireless network interface connected to a network such as the Internet for receiving one or more WDR images from a remote device into the system 100. In these embodiments, the WDR images may be in the form of one or more digital files or database records.

In still some alternative embodiments, the image input 104 may be an interface for connecting to a storage device. For example, the image input 104 may be a Universal Serial Bus (USB) port for connecting a removable storage device (such as a USB drive, a portable hard drive) to the system 100 to transfer one or more WDR images stored therein into the system 100. In these embodiments, the WDR images may be in the form of one or more digital files or database records.

In some alternative embodiments, the image input 104 may be a portion of the storage 108 storing one or more WDR images. In these embodiments, the WDR images may be in the form of one or more digital files or database records.

In some embodiments, the image input 104 may be a combination of above-described image input devices and components.

The image output 106 is one or more devices or components for outputting thereto one or more LDR images. For example, in some embodiments, the image output 106 may be a display suitable for displaying LDR images, such as a CRT display, a LCD display, a LED display such as a LED-LCD display or an organic light-emitting diode (OLED), a digital signage, or the like. While such displays are suitable for displaying LDR images, they may also be capable of displaying WDR images in some embodiments, although there may be less-needed for converting WDR images into LDR images in these embodiments. In these embodiments, the LDR images are the images presented on the display.

In some alternative embodiments, the image output 106 may be a publishing device suitable for presenting LDR images, such as an inkjet printer, a laser printer, or the like. In these embodiments, the LDR images are the images printed or otherwise presented by the publishing device on a publication media such as paper.

In yet some alternative embodiments, the image output 106 may be a wired or wireless network interface connected to a network such as the Internet for transmitting one or more LDR images to a remote device. In these embodiments, the LDR images may be in the form of one or more digital files or database records.

In still some alternative embodiments, the image output 106 may be an interface for connecting to a storage device. For example, the image output 106 may be a USB port for connecting a removable storage device (such as a USB drive, a portable hard drive) to the system 100 to transfer one or more WDR images thereto. In these embodiments, the LDR images may be in the form of one or more digital files or database records.

In some alternative embodiments, the image output 106 may be a portion of the storage 108 for storing one or more WDR images therein. In these embodiments, the LDR images may be in the form of one or more digital files or database records.

In some embodiments, the image output 106 may be a combination of above-described image output devices and components.

The storage 108 comprises a plurality of storage units accessible by the processing structure 102 for reading and/or storing data, including input data and data generated by the processing structure 102. The storage 108 may be volatile and/or non-volatile, non-removable or removable storage media such as RAM, ROM, EEPROM, solid-state memory, hard disks, CD, DVD, flash memory, or the like. In use, the storage 108 is generally divided into a plurality of portions or areas for different use purposes. For example, a portion of the storage 108 may be used for long-term data storing such as storing files or databases; another portion of the storage 108 may be used for caching data that is not currently used by the processing structure 102 such as a so-called "virtual memory"; yet another portion of the storage 108 (such as one or more high-speed RAM) may be used as the system memory for temporarily storing data generated or used during processing.

In various embodiments, the storage 108 may comprise a mixture of different types of storage media, or may consist of the same type of storage medium. Moreover, different portions of the storage 108 may be local to each other. Alternatively, some portions of the storage 108 may be remote to other portions thereof. For example, some portions of the storage 108 may be the storage media on the "cloud" that can be accessed via a network such as the Internet.

As described above, in some embodiments, a portion of the storage 108 may store one or more WDR images and may be used as an input 104. In some embodiments, and another portion of the storage 108 may be used as an output 106 for receiving and storing the LDR images.

Figure 2:
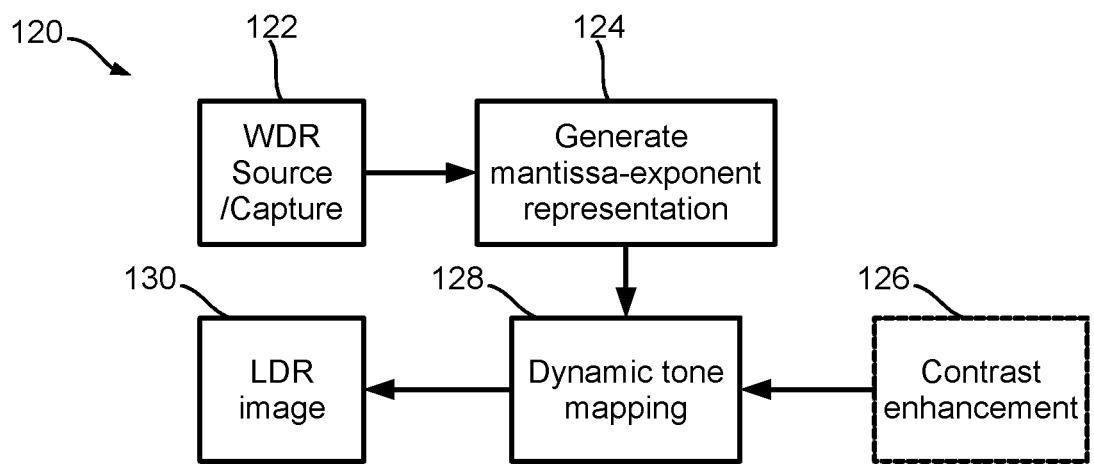
FIG. 2 is a simplified flowchart showing the steps of a process for converting a WDR image into a LDR image.

FIG. 2 is a flowchart showing the steps of a process 120 for converting a WDR image into a LDR image. As shown, a WDR image is obtained from the input 104 such as from a WDR image source or a WDR capture device (step 122). A mantissa-exponent representation of the WDR image is then generated (step 124). Then, a dynamic tone mapping method is used to process the WDR image (step 128). During the tone mapping process, multiple contrast enhancement techniques (block 126) can be optionally incorporated in order to increase the contrast of the finial output LDR image. After tone mapping, the WDR image is converted into a LDR image (step 130).

In the following, the mantissa-exponent representation, input pixel intensity range partitioning and tone mapping functions are first described. Then, the detail of step 124 and 128 are described.

Mantissa-Exponent Representation

As is known in the art, an image such as a WDR image comprises a plurality of pixels and each pixel comprises a set of values describing the characteristics thereof such as color, brightness, intensity, and the like.

Pixel values of an image may be represented in various formats. For example, integer representation, fixed point representation, and floating point representation may be the most commonly used pixel value representation formats. However, such representations only provide direct representation of the numerical values.

Some image processing methods use mathematical tools such as wavelet, principle component analysis, and sparse coding to transform the pixel values of an image into low-frequency bands and high-frequency bands. Low-frequency bands provide a coarse representation of the image, and may be denoted as a coarse layer hereinafter. High-frequency bands provide the detail of the image, and may be denoted as a detailed layer hereinafter.

As will be described in more detail below, the process 120 manipulates both the coarse layer and the detailed layer of a WDR image for converting the WDR image to a LDR image.

As is known in the art, each pixel p of an input WDR image has an input pixel intensity x(p) which may take a value x within an input pixel intensity range $R_{WDR}$. Herein, x(p) denotes the input pixel intensity of the pixel p of an input WDR image, and x denotes a possible value of x(p).

x may be represented in a mantissa-exponent form as:

$$x = m \times r^s, \quad (20)$$

where m is the mantissa of x, r is a radix, s is the exponent of x, and × represents multiplication.

In various embodiments, the parameters m, r, and s may take any suitable values such as integers and/or floating-point numbers.

For example, in some embodiments, m≥0, r>0, and s≥0.

In some embodiments, m=0 or m≥1. r>0. s=0 or s≥1.

In some embodiments, r>0. m and s are integers greater than or equal to zero (0).

In some embodiments, m, r, and s are integers, and r≠0.

In some embodiments, r is an integer greater than zero (0). m and s are integers greater than or equal to zero (0).

In some embodiments, r=2, and m and s are fixed-point integers greater than or equal to zero (0) for adapting to today's hardware implementation. In these embodiments, m and s may also be denoted as unsigned integers.

In some alternative embodiments where hardware resources are sufficient, m may be set as one (1) and the radix r may be chosen as any suitable positive value. For example, the radix r may be chosen as the natural base e. Thus, with a simple conversion, the input pixel intensity value x may be expressed as a logarithmic domain value s:

$$x = e^s. \quad (21)$$

Generally, the exponent s is a value within an input exponent value range, i.e., $s_l \leq s \leq s_u$, where $s_l$ and $s_u$ are the lower and upper boundary of s. Similarly, the mantissa m is a value within an input mantissa value range, i.e., $m_l \leq m \leq m_u$, where $m_l$ and $m_u$ are the lower and upper boundaries of m, respectively. Therefore, the input WDR images may have a dynamic range $R_{WDR} = \{m_l \times r^{s_l} \leq x \leq m_u \times r^{s_u}\}$.

In some embodiments, $m_l$ and $m_u$ are independent to the exponent value s. For example, s may be a 3-bit binary number with a value range of 0 to 7, and m may be a 10-bit binary number with a value range of 0 to 1023 regardless what value the exponent s may be.

In some alternative embodiments, $m_l$ and/or $m_u$ may be a function of the exponent value s, $m_l = m_l(s)$ and/or $m_u = m_u(s)$. For example, s may be a 1-bit binary number with a value range of 0 and 1. For s=0, m may be a 10-bit binary number with a value range of 0 to 1023 ($m_l = 0$ and $m_u = 1023$), and for s=1, m may be a 3-bit binary number with a value range of 0 to 7 ($m_l = 0$ and $m_u = 7$).

The mantissa-exponent representation of x allows a large range of the pixel intensity x to be represented using a relatively small memory space. For example, with r=2, $m \in [0, 1023]$ being a 10-bit binary number, and $s \in [0, 7]$ being a 3-bit binary number, the representation of x as in Equation (20) has a value range of 0 to 130944 and only requires 13 bits of memory space is required for each pixel. In various embodiments, the bit-lengths of m and s may be selected as needed to tradeoff between the representation range, precision and memory space.

The mantissa-exponent representation of Equation (20) partitions an image into a coarse layer represented by the exponent s and a detailed layer represented by the mantissa m. The coarse and/or detailed layers may be used to establish a tone-mapping transfer function for compressing the pixel intensity of a WDR image to convert the WDR image to a LDR image (described later).

Similarly, each pixel p of an output LDR image has an output pixel intensity y(p) which may take a value y within an output pixel intensity range $R_{LDR}$. Herein, y(p) denotes the input pixel intensity of the pixel p of an output LDR image, and y denotes a possible value of y(p).

Input Pixel Intensity Range Partitioning and Dynamic Tone Mapping Function

Referring again to FIG. 2, a dynamic tone mapping is used at step 128 to convert the WDR image into a LDR image, which uses a monotonic and continuous tone-mapping transfer function $f(x)$ to map each input pixel intensity value x(p) of a WDR image into an output pixel intensity value y(p)=$f$(x(p)). By using a suitable tone-mapping transfer function $f(x)$, the output pixel intensity range $R_{LDR}$ may be smaller than the input dynamic range $R_{WDR}$, and the output image is then a LDR image suitable for presenting on a LDR presentation device.

In some embodiments, the input coarse layer s is used to determine the function and/or parameters of the tone-mapping transfer function $f(x)$. Specifically, the input exponent value range $s_l < s < s_u$ of the coarse layer s is partitioned into a plurality of non-overlapped intervals. Let $s_0 < s_1 < \ldots < s_N$ be N+1 values within the input exponent value range, and $s_0 = s_l$ and $s_N = s_u$. Then, the range of the coarse layer s is partitioned into N intervals $\{s_0 \le s < s_1\}$, $\{s_1 \le s \le s_2\}$, ..., $\{s_{N-1} \le s < s_N\}$. Correspondingly, the range $R_{WDR}$ of x may be partitioned into N input pixel intensity intervals with the i-th interval expressed as:

$$X_i = \{m_l \times r^{s_i} < x < m_u \times r^{s_{i+1}}\}, \quad (22)$$

where i=0, 1, 2, ..., N−1.

In some embodiments where r is an integer greater than zero (0) such as r=2, and m and s are integers greater than or equal to zero (0), the range of the coarse layer s are partitioned into N intervals $\{s=i\}$, i=0, 1, 2, ..., N−1, and N−1 is the maximum of s. The range $R_{WDR}$ of input pixel intensity values x is partitioned into N input intensity intervals, with the i-th input pixel intensity interval expressed as:

$$X_i = \{m_{MIN} \times r^i \le x \le m_{max} \times r^i\}, \quad (23)$$

where i=0, 1, 2, ..., N−1, and $m_{MIN}$ and $m_{MAX}$ are the minimum and maximum of m, respectively. In other words, the input pixel intensity values x having a same exponent value s fall into the same input pixel intensity interval.

Figure 3:
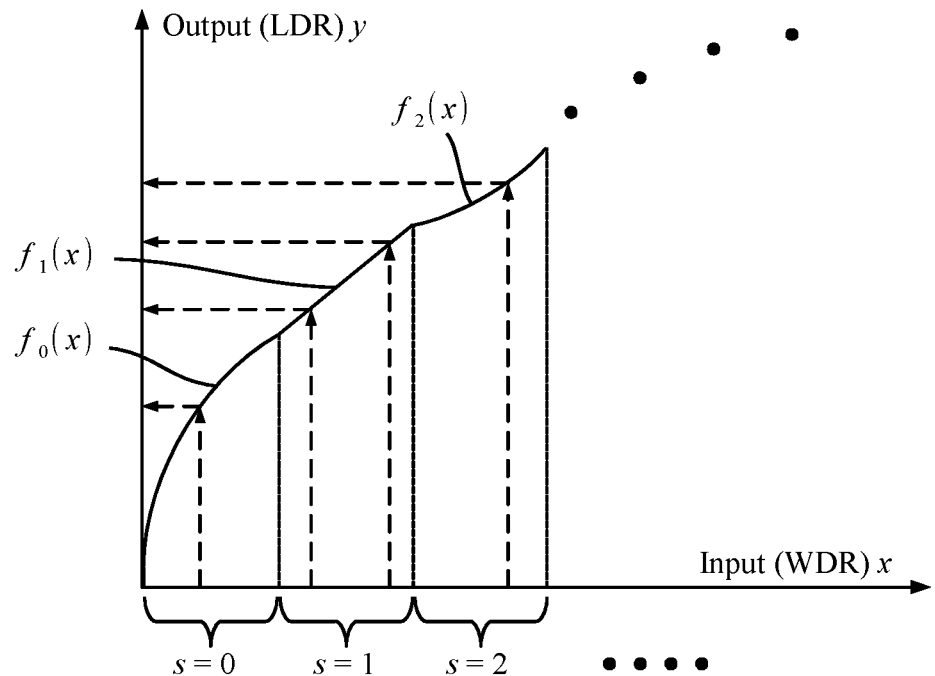
FIG. 3 shows a tone-mapping transfer function used in the system shown in FIG. 1, the tone-mapping transfer function comprising a plurality of sub-functions.

As shown in FIG. 3, the tone-mapping transfer function $f(x)$ comprises N sub-functions $f_i(x)$ each corresponding to an input pixel intensity interval. That is:

$$f(x) = f_i(x), \text{ if } x \in X_i, \quad (24)$$

where i=0, 1, 2, ..., N−1. Therefore, for a pixel p of an input WDR image having an input pixel intensity x(p), the output pixel intensity y(p) of the pixel p of the output image is calculated as:

$$y(p) = f(p)) = f_i(x(p)), \text{ if } x(p) \in X_i, \quad (25)$$

where i=0, 1, 2, ..., N−1.

Figure 4:
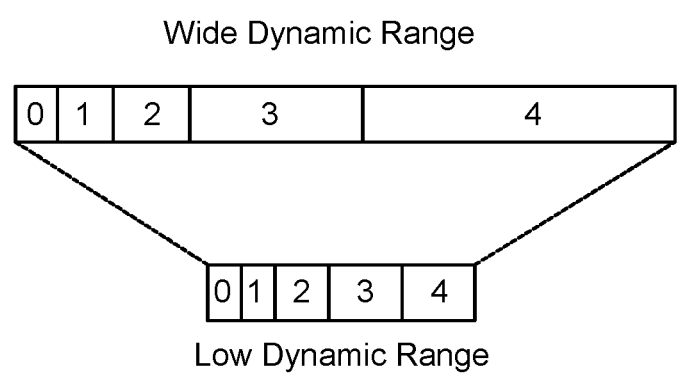
FIG. 4 is a schematic diagram showing conversion of a WDR image into a LDR image.

Thus, the dynamic tone mapping converts the input pixel intensity values in the input range $R_{WDR}$ to output pixel intensity values in the output range $R_{LDR}$. By using a suitable transfer function $f(x)$, the output range $R_{LDR}$ may be smaller than the input range $R_{WDR}$ as shown in FIG. 4, and a WDR image may be converted into a LDR image for output.

Various sub-functions $f_i(x)$ may be used in various embodiments. For example, in some embodiments, the sub-functions $f_i(x)$ may be different mathematical models or different mathematical functions, such as log-base functions, linear functions, functions based on histogram equalization, and/or the like.

In some embodiments, the sub-functions $f_i(x)$ may be a same mathematical function with different parameters.

In some embodiments, some sub-functions $f_i(x)$ may be different mathematical models, and some other sub-functions $f_i(x)$ may be a same mathematical model with different parameters.

In some embodiments, the transfer function $f(x)$ is a logarithmic function:

$$f(x) = \log_2(a_s \times x + b_s) + c_s, \quad (26)$$

where $a_s$, $b_s$ and $c_s$ are parameters.

Various compression levels can be achieved with different choices of $a_s$, $b_s$ and $c_s$ parameters. For example, in some embodiments, one may choose $a_s=1$, $b_s=1$ and $c_s=0$, and the transfer function $f(x)$ becomes:

$$f(x) = \log_2(x+1). \quad (27)$$

In some alternative embodiments, a second term is used to tune the compression level of pixels according to different exponent values:

$$f(x) = (\log_2(a_s \times x + b_s) + c_s) \times \log_2(g(m,s)) \times d_p + k_p, \quad (28)$$

where $a_s$, $b_s$, $c_s$, $d_p$, and $k_p$ are parameters, and the function g(m,s) is a function of mantissa m and exponent s. The function g(m,s) can be global or local based on the specific requirement of the final result. A more detailed description of parameter selections is provided later.

Histogram-Based Input Pixel Intensity Range Partitioning and Dynamic Tone Mapping Function In above embodiments, the input pixel intensity range $R_{WDR}$ is partitioned into a plurality of intervals based on the exponents. In some alternative embodiments, the input pixel intensity range $R_{WDR}$ is partitioned into a plurality of intervals based on both the coarse layer (for example the exponent s) and the detailed layer (for example the mantissa m). For example, the input pixel intensity range $R_{WDR}$ may be first partitioned into a plurality of coarse intervals based on the exponent s, and each coarse interval is further partitioned into a plurality of detailed intervals based on the mantissa m. Then, a sub-function $f_i(x)$ is defined for each detailed interval.

In some embodiments, the range of m, i.e., $m_l$ and/or $m_u$, is a function of the exponent value s, $m_l = m_l(s)$ and/or $m_u = m_u(s)$. In these embodiments, each coarse interval may be further partitioned into a plurality of detailed intervals based on the range of m. For example, a coarse interval corresponding to a larger range of m may be partitioned into more detailed intervals.

In some embodiments, the partitioning the input pixel intensity range $R_{WDR}$ may be based on a histogram.

As known in the art, a histogram is a representation of the pixel intensity distribution over a plurality of non-overlapped pixel intensity intervals that span a dynamic range, and may be calculated as the number of pixels of which the pixel intensity values fall within each interval. Depending on the implementation, a histogram or a pixel intensity distribution may be calculated based on one image such as the WDR image to be converted, a plurality of images with similar characteristics such as images of night scenes, or alternatively a plurality of images with different characteristics.

As shown in FIG. 4, by partitioning the input pixel intensity range $R_{WDR}$ into N intervals $X_0, X_1, \ldots, X_{N-1}$, the output pixel intensity range is also partitioned into N corresponding intervals, denoted as $Y_0, Y_1, \ldots, Y_{N-1}$. Pixels of a WDR image that fall into a same input pixel intensity interval $X_i$ are mapped to the same output pixel intensity interval $Y_i$. Those skilled in the art will appreciate that, if more pixels of a WDR image fall into an input pixel intensity interval $X_i$, it means that the pixels within this interval $X_i$ are more important to the detail of the image, and shall be more carefully processed in tone mapping.

Therefore, in some embodiments, a histogram of the WDR image to be processed is calculated to determine the pixel intensity distribution. The calculation of the histogram may be carried out after the generation of the mantissa-exponent representation and such calculation can be done in software, hardware or both software and hardware, with minimal resource requirements.

Then, one or more above-described input pixel intensity intervals are identified, each of which corresponds to a sufficiently high pixel distribution such as higher than a predefined threshold. Each of these identified input pixel intensity intervals is further partitioned into a plurality of input pixel intensity intervals. A transfer function $f(x)$ having a plurality of sub-functions $f_i(x)$ each corresponding to an input intensity interval is then determined.

Figure 5:
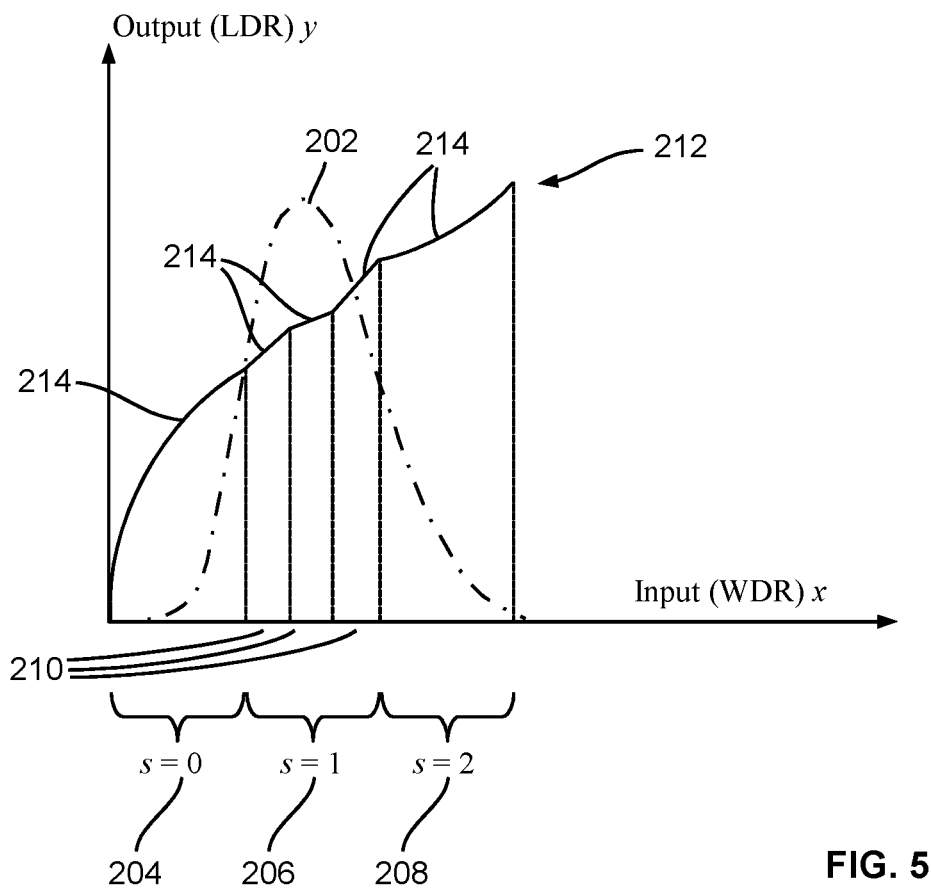
FIG. 5 shows an example of determining a transfer function with contrast enhancement.

FIG. 5 shows an example of determining a transfer function $f(x)$. As shown, the input pixel intensity range is partitioned into a plurality of intervals 204, 206 and 208 corresponding to s=0, s=1, and s=2, respectively. A histogram 202 of the WDR image to be converted is calculated, and it is determined that the input pixel intensity interval 206 corresponding to s=1 has an input pixel intensity distribution higher than a predefined threshold (not shown). Then, the interval 206 is further partitioned into a plurality intervals 210. Finally, a transfer function 212 is determined which has a plurality of sub-functions 214 each corresponding to an input pixel intensity interval 204, 206, 208 or 210.

In some alternative embodiments, a histogram of a set of WDR images is first determined. The set of WDR images may be a set of WDR images having similar photographic characteristics or classified as a same type of images such as WDR images taken under a similar illumination condition such as WDR images of night scenes. Such a histogram is then used for determining the input pixel intensity intervals in a manner similar to FIG. 5, and for determining a transfer function $f(x)$ having a plurality of sub-functions $f_i(x)$ each corresponding to an input intensity interval. The histogram of the set of WDR images and the determination of the transfer function $f(x)$ may be predetermined such as before the system 100 starts to convert any WDR image.

As described above, in some embodiments, the radix r=2, and the mantissa m and exponent s are fixed-point unsigned integers (greater than or equal to zero (0)). In these embodiments, the input pixel intensity range $R_{WDR}$ may be partitioned into a plurality of non-overlapped intervals $X_i = \{m_{MIN} \times r^i \leq x \leq m_{MAX} \times r^i\}$, i=0, 1, 2, ....

These embodiments provide an advantage of efficient hardware implementation and fast WDR-to-LDR image conversion. For example, a lookup table may be built for the transfer function $f(x)$. The lookup table comprises a plurality of entries. Each entry comprises a possible value of x represented as its mantissa m and exponent s, and the value of the transfer function $f(x) = f_i(x) = f_s(m \times r^s)$.

When converting a pixel p of the WDR image, the system 100 represents the pixel intensity x(p) thereof in the mantissa-exponent form:

$$x(p) = m(p) \times r^{s(p)}. \tag{29}$$

Then, the system 100 searches the lookup table using s(p) and m(p), and determines the output pixel intensity value of the pixel of the LDR image as $f_s(m \times r^s)$. The computational cost is then significantly reduced.

Dynamic Tone Mapping with Contrast Enhancement

For ease of description, in the following, the intensity x of input WDR pixels are represented in the mantissa-exponent format with the radix r=2, and the mantissa m and exponent s being fixed-point unsigned integers. The output pixel intensity range $R_{LDR}$ is $R_{LDR} = \{0 \leq y \leq y_{MAX}\}$.

As described above, in some embodiments, dynamic tone mapping with contrast enhancement is used (step 128 with block 126 in FIG. 2). In these embodiments, the output LDR image has a desired output pixel intensity distribution either predefined before any WDR-to-LDR image conversion or dynamically defined during the WDR-to-LDR image conversion.

In these embodiments, the dynamic range of the LDR image is partitioned into the same number of intervals as that of the WDR image. That is, the input pixel intensity range $R_{WDR}$ into N intervals $X_0, X_1, \ldots, X_{N-1}$ based on s and optionally m. The output pixel intensity range is partitioned into N intervals $Y_0, Y_1, \ldots, Y_{N-1}$ based on the output pixel intensity value y. Pixels of a WDR image that fall into an input pixel intensity interval $X_i$ are mapped to the output pixel intensity interval $Y_i$.

Figure 6:
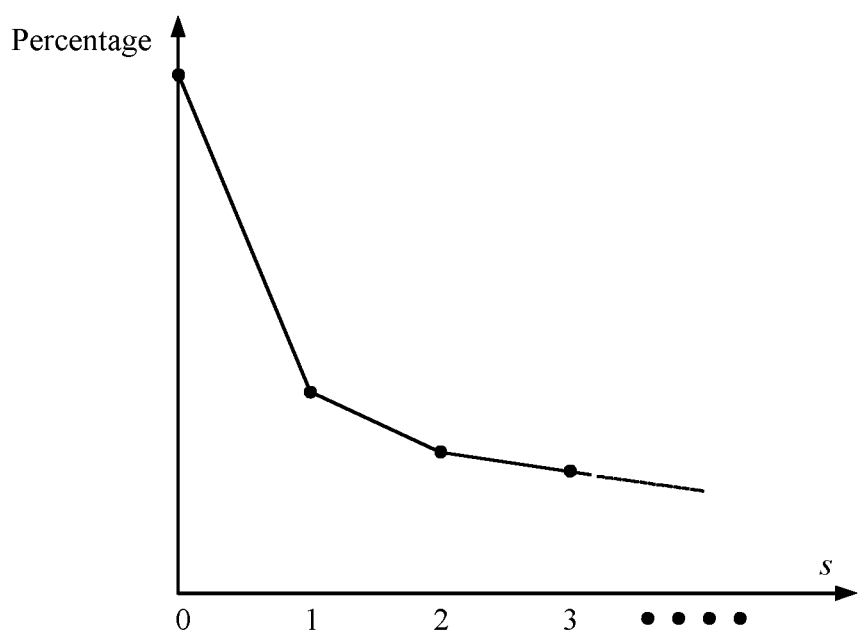
FIG. 6 shows an example of a reference pixel intensity distribution for converting a WDR image into a LDR image.

To reserve image details, the output LDR images shall statistically have more pixels fall into lower-end intervals (i.e., $Y_i$ with smaller i's), corresponding to a desired input pixel intensity distribution with the peak at a low exponent value. Therefore, in these embodiments, a reference input pixel intensity distribution is used for adjusting the output pixel intensity distribution towards a desired pixel intensity distribution. An example of a reference pixel intensity distribution over the exponent s is shown in FIG. 6. As shown, the majority of pixels statistically have pixel intensity values with their exponent values s equal to zero.

By using the reference pixel intensity distribution, the input pixel intensity range $R_{WDR}$ is partitioned based on a distribution D(s):

$$D(s) = \alpha \times D_{ref}(s) + \beta \times D_{hist}(s), \tag{30}$$

where $\alpha$ and $\beta$ are weight factors to balance between detail reproduction and contrast, and $\alpha + \beta = 1$; $D_{ref}(s)$ is the reference pixel intensity distribution; and $D_{hist}(s)$ is the input pixel intensity distribution of the WDR image to be processed. Thus, the distribution D(s) is a weighted combination of $D_{ref}(s)$ and $D_{hist}(S)$.

Those skilled in the art will appreciate that in some embodiments, $D_{hist}(s)$ may be the input pixel intensity distribution of a plurality of WDR images such as WDR images of night scenes.

In order to map an input pixel with a different exponent value to a different LDR interval, the parameter settings in Equation (28) is modified. For example in some embodiments, g(m,s) may be chosen as:

$$g(m, s) = \frac{2 \times m}{m_{MAX}} + s + 2. \tag{31}$$

where $m_{MAX}$ is the maximum of m (see Equation (23)). Moreover, in these embodiments, $a_s=1$, $b_s=1$, and $c_s=0$. Then, $f(x)$ as in Equation (28) only comprises two undetermined parameters $d_p$ and $k_p$:

$$f(x) = (\log_2(x+1)) \times \log_2\left(\frac{2 \times m}{m_{MAX}} + s + 2\right) \times d_p + k_p. \quad (32)$$

In order to make the transfer function $f(x)$ monotonic and continuous, the following boundary equations are solved:

$$f(p_{lowbound}) = y_{MAX} \times D(s), \quad (33)$$

$$f(p_{highbound}) = y_{MAX} \times D(s+1), \quad (34)$$

where $$p_{lowbound} = m_{MAX} \times 2^s, \quad (35)$$

$$p_{highbound} = m_{MAX} \times 2^{s+1} - 1. \quad (36)$$

Figure 7A:
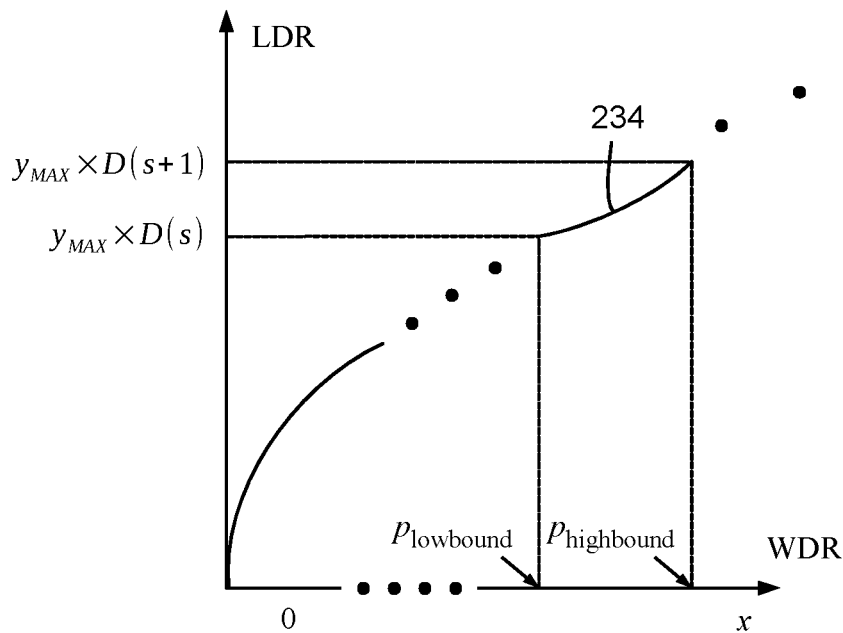
FIG. 7A is an example showing a schematic illustration of using a boundary condition to calculate the parameters of a tone-mapping transfer function.
Figure 7B:
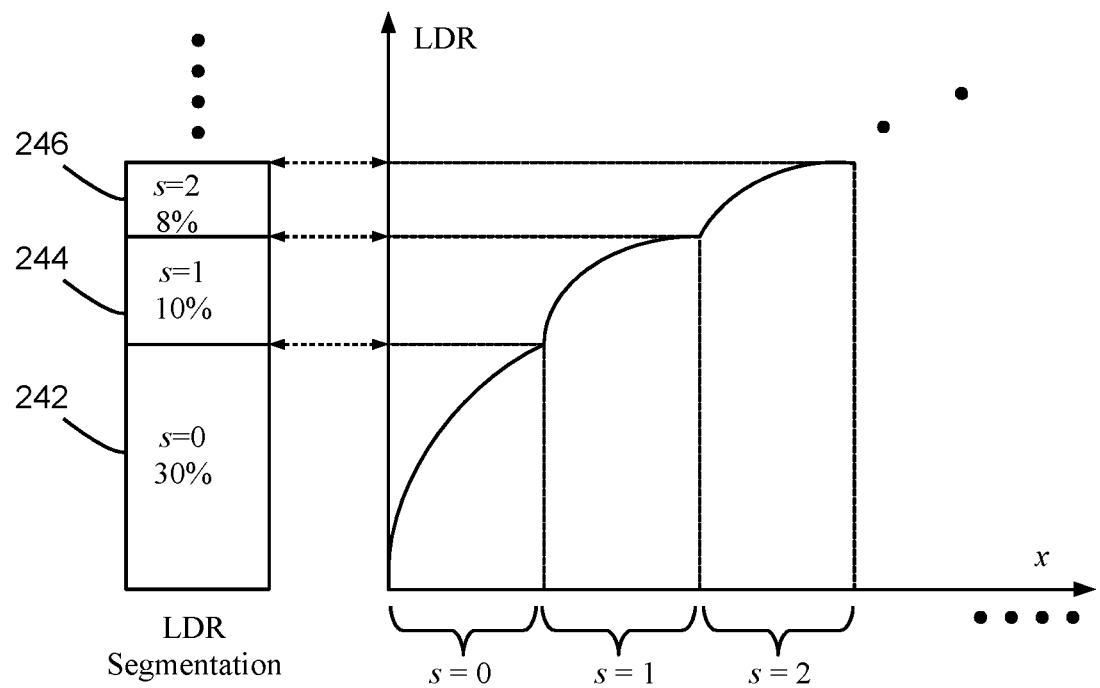
FIG. 7B is an example showing a schematic illustration of a tone-mapping transfer function, according to some alternative embodiments.

As shown in FIG. 7A, $p_{lowbound}$ and $p_{highbound}$ are the two boundaries of the transfer sub-function 234. The parameters $d_p$ and $k_p$ and consequently the transfer function $f(x)$ as in Equation (32) are then obtained by solving the above Equations (33) to (36). FIG. 7B is an example showing a schematic illustration of $f(x)$ with which the output LDR images statistically have a pixel intensity distribution of 30% within the first output pixel intensity interval 242 corresponding to the input interval s=0, 10% within the second output pixel intensity interval 244 corresponding to the input interval s=1, 80% within the third output pixel intensity interval 246 corresponding to the input interval s=2, and so on.

Step of Generating Mantissa-Exponent Representation

The step 124 of generating mantissa-exponent representation of the process 120 shown in FIG. 2 is now described.

Figure 8:
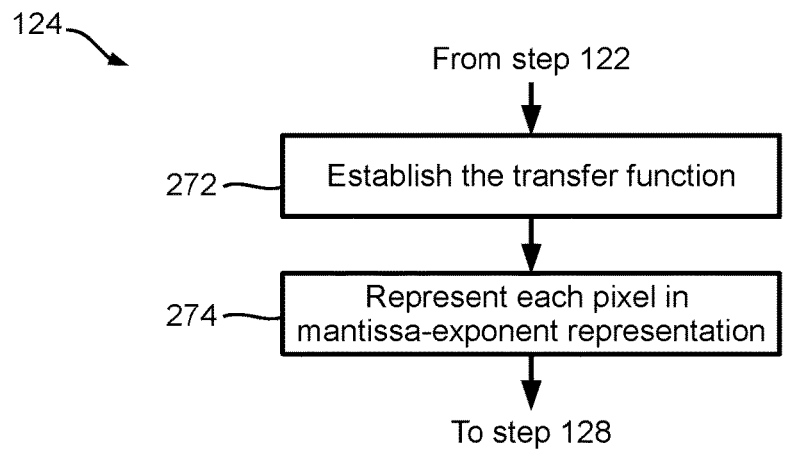
FIG. 8 shows the detail of a step of generating mantissa-exponent representation of the process shown in FIG. 2.

FIG. 8 shows the detailed of the step 124. As shown, the system 100 first establishes the transfer function $f(x)$ (step 272). At this step, the system 100 determines the intervals $X_i$ of the input pixel intensity range $R_{WDR}$ and determines the sub-function $f_i(x)$ for each interval $X_i$ as described above.

In some embodiments, the input pixel intensity range $R_{WDR}$ is a predetermined range such as the total pixel intensity range as defined by the WDR image file format. In these embodiments, the intervals $X_i$ of the input pixel intensity range $R_{WDR}$ and the sub-function $f_i(x)$ for each interval $X_i$ may also be predetermined and stored in the storage 106 (see FIG. 1).

In some alternative embodiments, the input pixel intensity range $R_{WDR}$ is dynamically determined for each WDR image to be processed. At step 272, the system 100 first determines the input pixel intensity range $R_{WDR}$ of the WDR image to be processed. Then, the system 100 partitions $R_{WDR}$ into a plurality of intervals $X_i$ and determines the sub-function $f_i(x)$ for each interval $X_i$ as described above. The determined intervals $X_i$ of the input pixel intensity range $R_{WDR}$ and the transfer function $f(x)=\{f_i(x), i=0, 1, 2, \ldots\}$ are stored in the storage 106.

After establishing the transfer function $f(x)$, the intensity of each pixel of the WDR image is represented in the mantissa-exponent form (step 274). The process then goes to step 128 to proceed the input WDR image and convert each pixel thereof into a pixel of a LDR image by using Equation (25).

Of course, in embodiments that the pixel intensity of the WDR image is already represented in the mantissa-exponent form, the system 100 can skip step 274.

Contrast Enhancement Using Clustering

Figure 9:
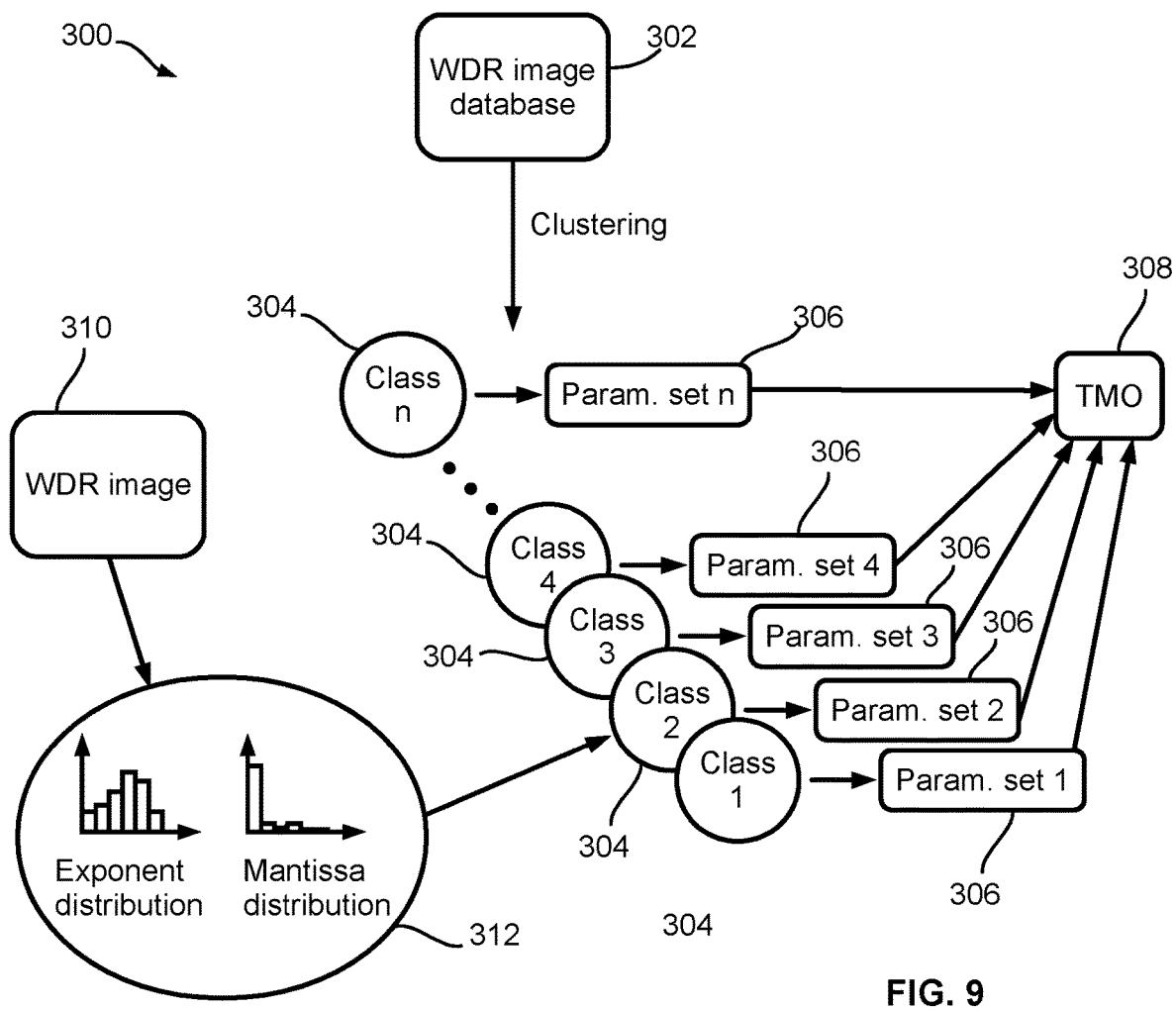
FIG. 9 is a schematic diagram illustrating a contrast enhancement process, according to some alternative embodiments.

FIG. 9 is schematic diagram illustrating a contrast enhancement process 300 in some alternative embodiments. The process 300 uses a clustering algorithm to classify the input WDR images in a WDR database 302 into a plurality of classes 304 based on suitable classification criteria. For example, in some embodiments, the classification may be based on a set of photographical characteristics, and the input WDR images having similar photographical characteristics may be classified into a same class 304. In some embodiments, the classification may be based on illumination and/or scenery conditions, and the input WDR images may be classified into classes 304 of night scene, sunny illumination, cloudy illumination, sports, portraits, and the like. In some embodiments, the classification may be based on the exponent distributions and the mantissa distributions thereof. In some embodiments, the classification may be based on applications and/or uses such as medical images, security images, and the like.

For each class 304, the parameter settings 306 thereof such as the input pixel intensity range partitioning and/or the tone-mapping transfer sub-functions $f_i(x)$ may be optimized by a tone-mapping optimization (TMO) process 308 before tone mapping for obtaining the best suitable input pixel intensity range partitioning and/or the best suitable tone-mapping transfer function $f(x)$ for the class 304.

The clustering algorithm can be any unsupervised clustering or classification algorithm. As clustering may be computationally costly, clustering may be conducted off-line without increasing the complexity of tone mapping which may need to be conducted in real-time.

During tone mapping for a WDR image 310, the process 300 first analyzes the exponent and mantissa distributions 312 of the WDR image 310 to determine the class 304 (such class 2 in FIG. 9) that the WDR image belongs to. Then, the set of the parameters 306 of the WDR image 310 in accordance with the determined class 304 are used by the tone mapping algorithm for converting the input WDR image 310 into an output LDR image.

Figure 10:
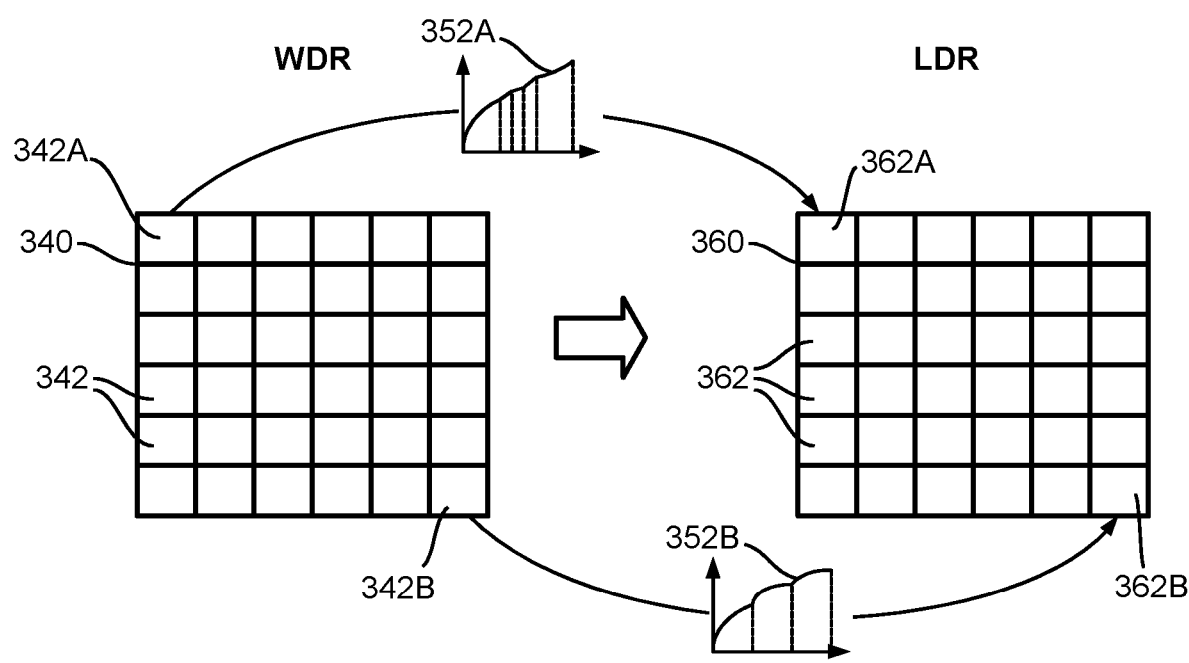
FIG. 10 shows a WDR-to-LDR image conversion process, according to some alternative embodiments.

The tone mapping process described in above embodiments is a global tone mapping operator which uses a single transfer function (comprising a plurality of sub-functions) for converting each pixel of the WDR image into a pixel of an output LDR image. In processing each pixel of the WDR image, the tone mapping process does not take into account the surrounding pixels thereof Dynamic Tone Mapping with Image Fusion FIG. 10 shows a WDR-to-LDR image conversion process in some alternative embodiments. As shown, a WDR image 340 is partitioned into a plurality of blocks 342. For each block 342, the system 100 determines a tone-mapping transfer function therefor and uses the determined tone-mapping transfer function to convert the block 342 into an output image block 362 for forming the output LDR image 360.

In determining the tone-mapping transfer function for a block 342, the system 100 may calculate the pixel intensity distribution of the block 342 and determine the pixel intensity range partitioning and the corresponding tone-mapping transfer function according to the calculated pixel intensity distribution, as described above. Consequently, each block 342 may have a different tone-mapping transfer function. In the example shown in FIG. 10, a tone-mapping transfer function 352A and the corresponding pixel intensity range partitioning are determined for a block 342A, and is used to convert the block 342A into an output block 362A of the LDR image 360. Another tone-mapping transfer function 352B and the corresponding pixel intensity range partitioning are determined for another block 342B, and is used to convert the block 342B into an output block 362B of the LDR image 360.

Figure 11:
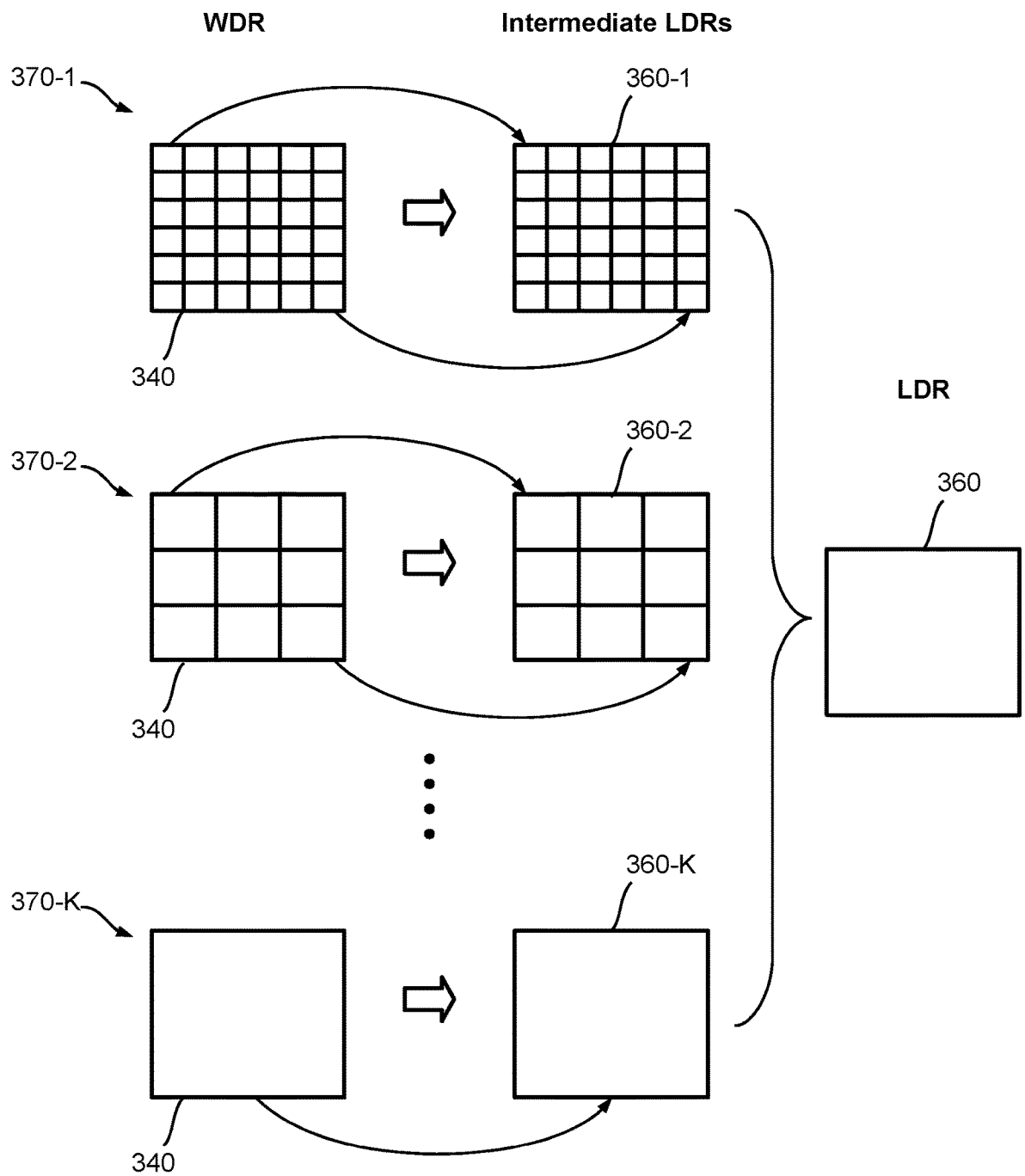
FIG. 11 shows a WDR-to-LDR image conversion process, according to some other embodiments.

FIG. 11 shows a WDR-to-LDR image conversion process in some alternative embodiments. A WDR image 340 is processed a plurality of K times, K>1 being an integer, to generate a plurality of intermediate LDR images 360-1 to 360-K, which are then combined to obtain an output LDR image 360. In FIG. 11, the K processings are denoted as 370-1 to 370-K.

In each of the processings 370-1 to 370-K, the WDR image 340 is partitioned into a different number of blocks. The blocks in each of the processings 370-1 to 370-K therefore have a different size. For example, in the processing 370-1, the WDR image 340 is partitioned into a first number of blocks each having a size of 32 pixels by 32 pixels. In the processing 370-2, the WDR image 340 is partitioned into a second number of blocks each having a size of 64 pixels by 64 pixels. In the processing 370-K, the entire WDR image 340 is used as a single block.

It is noted that the block size can affect the visual appearance of the generated LDR image. Usually, smaller block sizes can reveal more detail and contrast in the generated LDR image, but larger block sizes can maintain more brightness monotonicity therein. In some embodiments, the smallest block size is 32-by-32 pixels. In some alternative embodiments, the smallest block size is 64-by-64 pixels. In yet some alternative embodiments, the smallest block size may be 2-by-2 pixels.

In some embodiments, the largest block size is the size of the WDR image to be processed.

In each of the processing 370-1 to 370-K, after WDR image partitioning, the blocks are processed as shown in FIG. 10 to obtain an intermediate LDR image 360-1 to 360-K. Then, the intermediate LDR images 360-1 to 360-K are fused as, for each pixel p of the output LDR image, $$y(p) = \frac{\sum_{i=1}^{K} a_i(p) y_i(p)}{\sum_{i=1}^{K} a_i(p)}, \quad (37)$$

where $y_i(p)$ is the pixel intensity value of the pixel p of the i-th intermediate LDR image 360-i, and $a_i(p)$ is a weighting factor for the pixel p of the i-th intermediate LDR image 360-i. The weight factors $a_i(p)$ may take any suitable values such as being predefined, being determined by a user, or automatically calculated by the system 100. For example, in some embodiments, the weight factors $a_i(p)$ may be calculated as:

$$a_i(p) = \frac{\sigma_i(p)}{\sigma_i(p) + \varepsilon}, \quad (38)$$

where $\sigma_i(p)$ is the pixel intensity variance of the WDR image block used in the i-th processing 370-i for determining the transfer function for calculating the intensity of the pixel p of the i-th intermediate LDR image 360-i, and E is a user defined parameter.

Figure 12:
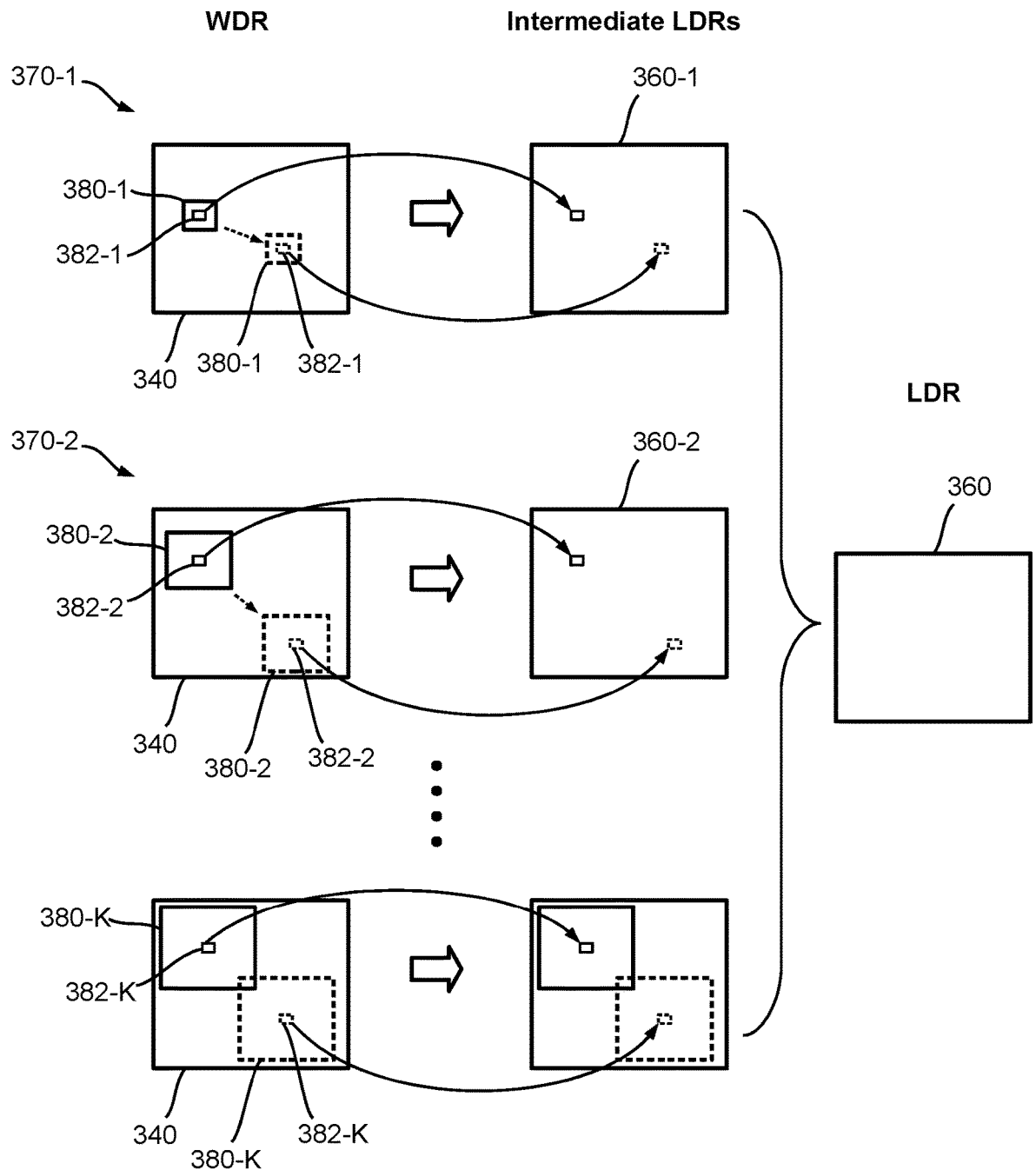
FIG. 12 shows a WDR-to-LDR image conversion process using a moving window, according to yet some other embodiments.

FIG. 12 shows a WDR-to-LDR image conversion process in some alternative embodiments. Similar to the process shown in FIG. 11, in these embodiments, a WDR image 340 is processed a plurality of K times to generate a plurality of intermediate LDR images 360-1 to 360-K, which are then combined to obtain an output LDR image 360. The K processings are also denoted as 370-1 to 370-K.

In each processing 370-i, a moving window 380-i is used to determine the pixel intensity range partitioning and the corresponding tone-mapping transfer function according to the pixel intensity distribution of the pixels in the window 380-i, as described above. Then, a set of the WDR pixels 382-i within the window 380-i are converted to corresponding LDR pixels using the determined tone-mapping transfer function of the window 380-i. The moving window 380-i then move to a next position in the WDR image 340 to convert another set of pixels. An intermediate LDR image 360-i is obtained when all pixels in the WDR image 340 are converted.

The moving window 380-i in each processing 370-i may have a different size. For example, the moving window 380-1 in the processing 370-1 may have a size of 32 pixels by 32 pixels. The moving window 380-2 in the processing 370-2 may have a size of 64 pixels by 64 pixels. The moving window 380-K in the processing 370-K may have the size of the WDR image 340.

In some embodiments, the smallest window size is 32-by-32 pixels. In some alternative embodiments, the smallest window size is 64-by-64 pixels. In some embodiments, the largest window size is the size of the WDR image to be processed.

In some embodiments, the set of WDR pixels 382-i in each processing 370-i may have a different size, and the embodiments shown in FIG. 11 may be considered as a special case of the embodiments shown in FIG. 12. That is, all WDR pixels in a window are converted to LDR pixels.

In some embodiments, the set of WDR pixels 382-i in all processings 370-i may have a same size. For example, the set of WDR pixels 382-i in all processings 370-i may be one (1) pixel.

Figure 13A:
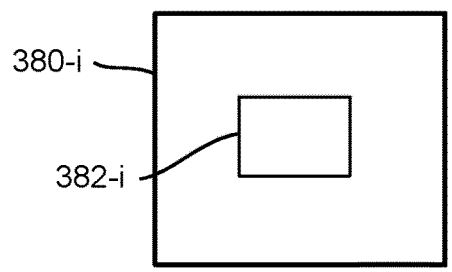
FIGS. 13A to 13D are examples showing the position of a set of pixels to be processed within a moving window shown in FIG. 12.
Figure 13B:
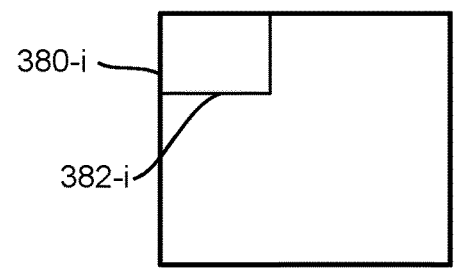
Figure 13C:
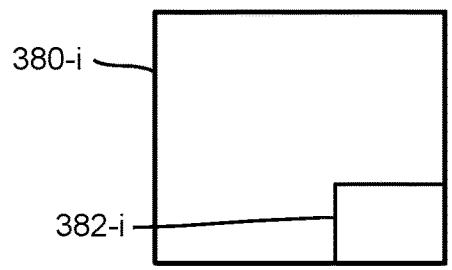
Figure 13D:
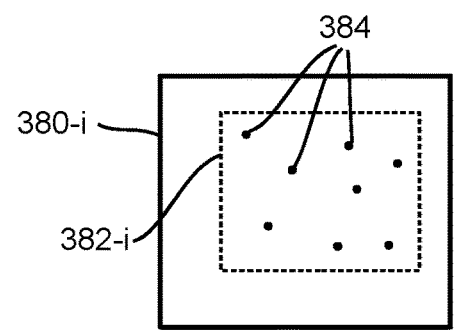

In various embodiments, the set of pixels 382-i may be at any position within the window 380-i. For example, in some embodiments as shown in FIG. 13A, the set of pixels 382-i may be at the center of the window 380-i. In some embodiments as shown in FIG. 13B, the set of pixels 382-i may be at the top-left corner of the window 380-i. In some embodiments as shown in FIG. 13C, the set of pixels 382-i may be at the bottom-right corner of the window 380-i. In some embodiments as shown in FIG. 13D, the set of pixels 382-i may be a set of pixels 384 within the window 380-i that may not be adjacent to each other.

Figure 14:
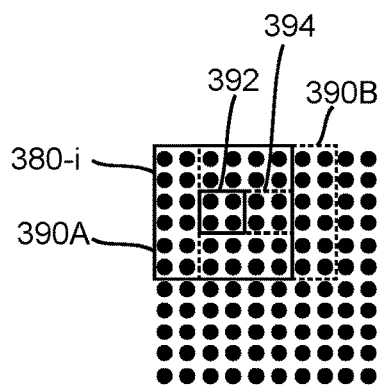

In some embodiments, after a set of pixels 382-i are converted, the moving window 380-i moves to a next position such that another set of pixels adjacent to the processed set of pixels 382-i are then processed. For example, as shown in FIG. 14, when the moving window 380-i is at a position 390A marked in solid lines, a set of k-by-k pixels 392 are converted to LDR pixels. Then, the window 380-i moves towards the right by k pixels to a next position 390B marked in broken lines such that a set of pixels 394 adjacent to the pixel set 392 are processed.

Figure 15A:
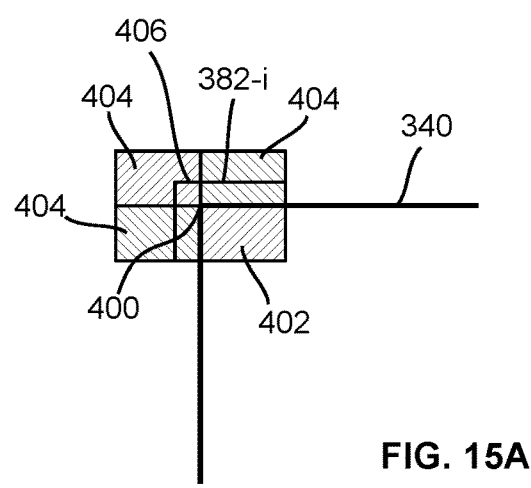
FIGS. 15A and 15B are two examples showing pixel mirroring for filling the moving window when the moving window is partially overlapped with a WDR image.

When the moving window 380-i is traversing the WDR image 340, the window 380-i may only partially overlap with the WDR image 340. In this case, the pixels of the WDR image 340 within the window 380-i may be mirrored to fill the window 380-i. For example, as shown in FIG. 15A, the window 380-i is about a corner 400 of the WDR image 340, and is partially overlapped with the WDR image 340 at a region 402. In this case, the pixels in region 402 are mirrored about the corner 400 to obtain pixels in areas 404. Then, the pixels in the combined areas of 402 and 404 overlapping the window 382-$i$, i.e., the area 406, are used for calculating the pixel intensity distribution and for determining the pixel intensity range partitioning and the tone-mapping transfer function.

Figure 15B:
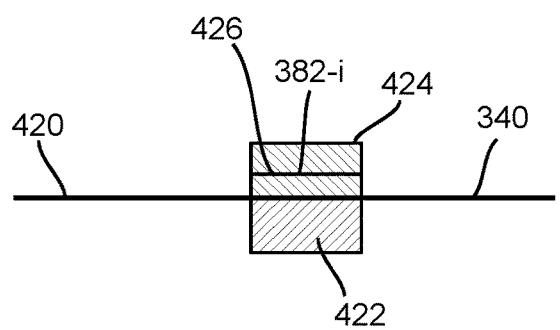

In another example shown in FIG. 15B, the window 380-$i$ is about a side 420 of the WDR image 340, and is partially overlapped with the WDR image 340 at a region 422. In this case, the pixels in region 422 are mirrored about the side 420 to obtain pixels in area 424. Then, the pixels in the combined areas of 422 and 424 overlapping the window 382-$i$, i.e., the area 426, are used for calculating the pixel intensity distribution and for determining the pixel intensity range partitioning and the tone-mapping transfer function.

Referring back to FIG. 12, in each processing 370-$i$, an intermediate LDR image 360-$i$ is obtained after the moving window 380-$i$ has traversed the entire WDR image 340 and all pixels in the WDR image 340 are converted. Then, the intermediate LDR images 360-1 to 360-K are fused to obtain an output LDR image 360 by using Equations (37) and (38).

Although in above examples, the blocks and/or the moving window is described as square blocks and/or a square window, in various alternative embodiments, the blocks and/or the moving window may be in any suitable shapes such as rectangle, triangle, hexagon, and the like.

Those skilled in the art will appreciate that, in some embodiments, the dynamic tone mapping with image fusion as shown in FIGS. 10 to 12 may not necessarily require input pixel intensity partitioning and a transfer function over a plurality of intervals. Rather, any suitable transfer functions may be used and determined for each image block and/or the moving window.

Those skilled in the art will appreciate that, in some embodiments, the dynamic tone mapping with image fusion as shown in FIGS. 10 to 12 may not necessarily require any specific value representation such as the mantissa-exponent representation. Rather, any value representations may be used.

Output LDR Image Filtering

In order for human visual systems to identify and separate out the details in a LDR image, sufficient contrast is generally required between the pixels of the LDR image. Accordingly, in some embodiments, the LDR image obtained from above-described tone-mapping is further filtered by a contrast-enhancing filter. For example, a suitable contrast-enhancing filter may be an un-sharpening mask as follows:

$$t(p)=|q(p)+(q(p)-(q*l)(p))|=|2\times q(p)-(q*l)(p)|, \quad (39)$$

where $t(p)$ is the filtered LDR image, $q(p)$ is the LDR image obtained from tone-mapping, $l(p)$ is a low-pass filter, and symbol * denotes the convolution operation. The processed image $t(p)$ is a contrast-enhanced version of $q(p)$ since $t(p)$ tends to highlight the edges therein. The absolute value in Equation (39) ensures that the intensity values of $t(p)$ are positive.

In some embodiments, it is also suitable to use a Gaussian filter as $l(p)$ which has good local properties and which can be efficiently implemented in hardware. Those skilled in the art will appreciate that other low-pass filter may be alternatively used as $l(p)$. Those skilled in the art will also appreciate that other contrast-enhancement algorithms may be alternatively used for processing the LDR images obtained from tone-mapping.

Alternative Embodiments

As described above, the input pixel intensity range $R_{WDR}$ is partitioned into a plurality of input pixel intensity intervals based on an intensity value representation having a coarse layer and a detailed layer. In some embodiments, the interval partitioning may be based on the coarse layer only. In some alternative embodiments, the interval partitioning may be based on both the coarse layer and the detailed layer.

A transfer function $f(x)$ having a plurality of sub-functions $f_i(x)$ each being determined over a corresponding input pixel intensity interval is then determined, and used for converting each WDR pixel into a LDR pixel.

In some embodiments, the interval partitioning may be based on the coarse layer, the detailed layer, and a histogram/pixel intensity distribution. The histogram may be a pixel intensity distribution of the WDR image to be processed, thereby providing an advantage of adapting the transfer function $f(x)$ with the characteristics of the WDR image to be processed for contrast enhancement and/or maintaining image details.

Alternatively, the histogram may be a statistic pixel intensity distribution determined from a set of WDR images such as a set of WDR images classified in a same category based on similar photographic features, illumination characteristics, applications, uses, and the like. Such a statistic histogram may be predetermined before the start of WDR-LDR image conversion, thereby providing an advantage of reduced computational cost.

In above embodiments, intensity value representation is a mantissa-exponent representation, the coarse layer is the exponent s, and the detailed layer is the mantissa m. The interval partitioning and the transfer function determination are based on the exponent s, the mantissa m, and/or other criteria such as a histogram.

In various alternative embodiments, the input pixel intensity range $R_{WDR}$ may be partitioned into a plurality of intervals based on other suitable criteria. For example, in some alternative embodiments, the input pixel intensity range $R_{WDR}$ may be uniformly partitioned into a plurality of intervals each having the same interval range. Such interval partitioning may be considered as a special case of the interval partitioning based on both the exponent s and the mantissa m with the radix r=1.

Other intensity value representations having a coarse layer and a detailed layer may alternatively be used, and the above-described system and methods, including input pixel intensity range partitioning, the transfer function determination, dynamic tone mapping, dynamic tone mapping with contrast enhancement, and dynamic tone mapping with image fusion, may all be based on such intensity value representations.

For example, in some embodiments where the intensity values are represented as numbers having a plurality of digits, one or more most significant digits may be used as a coarse layer, and one or more least significant digits may be used as a detailed layer.

In some embodiments where the intensity values are multiple-bit binary integers, one or more most significant bits (MSBs) may be used as a coarse layer, and one or more least significant bits (LSBs) may be used as a detailed layer. In these embodiments, the input pixel intensity range $R_{WDR}$ may be partitioned into a plurality of intervals based on the coarse layer, and/or the detailed layer, and/or other criteria, as described above.

Although embodiments have been described above with reference to the accompanying drawings, those of skill in the art will appreciate that variations and modifications may be made without departing from the scope thereof as defined by the appended claims.

What is claimed is:

1. A method of converting an input wide dynamic range (WDR) image into an output low dynamic range (LDR) image, the pixels of the input WDR image having a first dynamic range $R_{WDR}$ and the pixels of the output LDR image having a second dynamic range $R_{LDR}$ smaller than the first dynamic range, the method comprising:
representing each intensity value x within the first range $R_{WDR}$ as $x=m\times r^s$ with m being a mantissa of x, r being a radix, s being an exponent of x, and × representing multiplication;
partitioning the first range $R_{WDR}$ into a plurality of input intervals $X_i$ with i being an integer and i≥0, based at least on values of the exponents within the first range $R_{WDR}$, the input intervals $X_i$ being non-overlapped and spanning the first dynamic range $R_{WDR}$;
obtaining a transfer function $f(x)$ over the first dynamic range $R_{WDR}$, the transfer function $f(x)$ comprising a plurality of sub-functions $f_i(x)$, each sub-function $f_i(x)$ being determined over one of the input intervals $X_i$ of the first dynamic range $R_{WDR}$;
determining the intensity y(p) of each pixel p of the output LDR image by using the transfer function $f(x)$ and at least the intensity value x(p) of the corresponding pixel p of the input WDR image; and
outputting the output LDR image.

2. The method of claim 1 wherein said obtaining the transfer function $f(x)$ comprises:
maintaining a lookup table of the transfer function $f(x)$, wherein said lookup table comprises a plurality of entries, each entry comprises a value of x represented as its mantissa m and exponent s, and the corresponding value of $f(x)$; and
wherein said determining the intensity y(p) of each pixel p of the output LDR image comprises:
representing the intensity value x(p) of the pixel p of the input WDR image in the mantissa-exponent form:

$$x(p)=m(p)\times r^{s(p)};$$

searching the lookup table using s(p) and m(p) for determining the corresponding value of $f(x(p))$; and
using the determined value of $f(x(p))$ as the intensity value of the pixel p of the output LDR image.

3. The method of claim 1 wherein the transfer function $f(x)$ is:

$$f(x)=(\log_2(a_s\times x+b_s)\times c_s)\times \log_2(g(m,s))\times d_p+k_p,$$

where $a_s$, $b_s$, $c_s$, $d_p$, and $k_p$ are parameters, and the function g(m,s) is a function of the mantissa m and the exponent s.

4. The method of claim 1 wherein said non-overlapped input intervals of the first dynamic range $R_{WDR}$ are partitioned based on at least the exponent s and a weighted combination D of a reference pixel intensity distribution and an input pixel intensity distribution:

$$D=\alpha\times D_{ref}+\beta\times D_{hist},$$

where α and β are weight factors and α+β=1; $D_{ref}$ is the reference pixel intensity distribution; and $D_{hist}$ is the input pixel intensity distribution.

5. The method of claim 1 further comprising:
establishing a plurality of WDR image classes; and
establishing a plurality of transfer functions each for one of the plurality of WDR image classes;
wherein said obtaining the transfer function $f(x)$ comprises:
determining one of the plurality of WDR image classes for the input WDR image; and
determining the transfer function $f(x)$ as one of the plurality of transfer functions based on the determined WDR image class.

6. A system for converting an input WDR image into an output LDR image, the pixels of the input WDR image having a first dynamic range $R_{WDR}$ and the pixels of the output LDR image having a second dynamic range $R_{LDR}$ smaller than the first dynamic range, the system comprising:
an input for inputting the input WDR image;
an output for outputting the output LDR image; and
a processing structure comprising one or more computing processors or one or more circuits, the processing structure functionally coupled to the input and the output, the processing structure being configured for:
representing each intensity value x within the first range $R_{WDR}$ as $x=m\times r^s$ with m being a mantissa of x, r being a radix, s being an exponent of x, and × representing multiplication;
partitioning the first range $R_{WDR}$ into a plurality of input intervals $X_i$ with i being an integer and i≥0, based at least on values of the exponents within the first range $R_{WDR}$, the input intervals $X_i$ being non-overlapped and spanning the first dynamic range $R_{WDR}$,
obtaining a transfer function $f(x)$ over the first dynamic range $R_{WDR}$, the transfer function $f(x)$ comprising a plurality of sub-functions $f_i(x)$, each sub-function $f_i(x)$ being determined over one of the input intervals $X_i$ of the first dynamic range $R_{WDR}$,
determining the intensity y(p) of each pixel p of the output LDR image by using the transfer function $f(x)$ and at least the intensity value x(p) of the corresponding pixel p of the input WDR image; and
outputting the output LDR image.

7. The system of claim 6 wherein said obtaining the transfer function $f(x)$ comprises:
maintaining a lookup table of the transfer function $f(x)$, wherein said lookup table comprises a plurality of entries, each entry comprises a value of x represented as its mantissa m and exponent s, and the corresponding value of $f(x)$; and
wherein said determining the intensity y(p) of each pixel p of the output LDR image comprises:
representing the intensity value x(p) of the pixel p of the input WDR image in the mantissa-exponent form:

$$x(p)=m(p)\times r^{s(p)};$$

searching the lookup table using s(p) and m(p) for determining the corresponding value of $f(x(p))$; and
using the determined value of $f(x(p))$ as the intensity value of the pixel p of the output LDR image.

8. The system of claim 6 wherein the transfer function $f(x)$ is:

$$f(x)=(\log_2(a_s\times x+b_s)+c_s)\times\log_2(g(m,s))\times d_p+k_p,$$

where $a_s$, $b_s$, $c_s$, $d_p$, and $k_p$ are parameters, and the function g(m,s) is a function of mantissa m and exponent s.

9. The system of claim 6 wherein r=2, and m and s are integers greater than or equal to zero.

10. The system of claim 6 wherein said non-overlapped input intervals of the first dynamic range $R_{WDR}$ are partitioned based on at least the exponent s and a weighted combination D of a reference pixel intensity distribution and an input pixel intensity distribution:

$$D = \alpha \times D_{ref} + \beta \times D_{hist},$$

where $\alpha$ and $\beta$ are weight factors and $\alpha+\beta=1$; $D_{ref}$ is the reference pixel intensity distribution; and $D_{hist}$ is the input pixel intensity distribution.

11. The system of claim 10 wherein r=2, and m and s are integers greater than or equal to zero; wherein D=D(s), $D_{ref}=D_{ref}(S)$, $D_{hist}=D_{hist}(s)$ are functions of s; wherein the first pixel intensity range $R_{WDR}$ is between zero and a maximum value $m_{MAX}$, and the second pixel intensity range $R_{LDR}$ is between zero and a maximum value $y_{MAX}$; wherein the transfer function $f(x)$ is:

$$f(x) = (\log_2(x+1)) \times \log_2\left(\frac{2 \times m}{m_{MAX}} + s + 2\right) \times d_p + k_p, \quad (1)$$

where $d_p$ and $k_p$ are parameters; and
wherein $d_p$ and $k_p$ are the solutions of functions:

$$f(p_{lowbound}) = y_{MAX} \times D(s), \quad (2)$$

$$f(p_{highbound}) = y_{MAX} \times D(s+1), \quad (3)$$

where $$p_{lowbound} = m_{MAX} \times 2^s, \quad (4)$$

$$p_{highbound} = m_{MAX} \times 2^{s+1} - 1. \quad (5)$$

12. The system of claim 6 wherein the processing structure further acts for:
  establishing a plurality of WDR image classes; and
  establishing a plurality of transfer functions each for one of the plurality of WDR image classes;
  wherein said obtaining the transfer function $f(x)$ comprises:
    determining one of the plurality of WDR image classes for the input WDR image; and
    determining the transfer function $f(x)$ as one of the plurality of transfer functions based on the determined WDR image class.

13. A non-transitory computer-readable storage device comprising computer-executable instructions for converting an input WDR image to an output LDR image, the pixels of the input WDR image having a first dynamic range $R_{WDR}$ and the pixels of the output LDR image having a second dynamic range $R_{LDR}$ smaller than the first dynamic range, wherein the instructions, when executed, cause a processing structure to act for:
  representing each intensity value x within the first range $R_{WDR}$ as $x=m \times r^s$ with m being a mantissa of x, r being a radix, s being an exponent of x, and × representing multiplication;
  partitioning the first range $R_{WDR}$ into a plurality of input intervals $X_i$ with i being an integer and i≥0, based at least on values of the exponents within the first range $R_{WDR}$, the input intervals $X_i$ being non-overlapped and spanning the first dynamic range $R_{WDR}$;
  obtaining a transfer function $f(x)$ over the first dynamic range $R_{WDR}$, the transfer function $f(x)$ comprising a plurality of sub-functions $f_i(x)$, each sub-function $f_i(x)$ being determined over one of the input intervals $X_i$ of the first dynamic range $R_{WDR}$;
  determining the intensity y(p) of each pixel p of the output LDR image by using the transfer function $f(x)$ and at least the intensity value x(p) of the corresponding pixel p of the input WDR image; and
  outputting the output LDR image.

14. The non-transitory computer-readable storage device of claim 13 wherein said partitioning the first range $R_{WDR}$ into the plurality of input intervals $X_i$ comprising: partitioning the first range $R_{WDR}$ into the plurality of input intervals $X_i$ based at least on the values of the exponent s within the first range $R_{WDR}$, the values of the mantissa m within the first range $R_{WDR}$, and a pixel intensity distribution.

15. The non-transitory computer-readable storage device of claim 13 wherein said obtaining the transfer function $f(x)$ comprises:
  maintaining a lookup table of the transfer function $f(x)$, wherein said lookup table comprises a plurality of entries, each entry comprises a value of x represented as its mantissa m and exponent s, and the corresponding value of $f(x)$; and
  wherein said determining the intensity y(p) of each pixel p of the output LDR image comprises:
    representing the intensity value x(p) of the pixel p of the input WDR image in the mantissa-exponent form:

$$x(p) = m(p) \times r^{s(p)};$$

searching the lookup table using s(p) and m(p) for determining the corresponding value of $f(x(p))$; and
    using the determined value of $f(x(p))$ as the intensity value of the pixel p of the output LDR image.

16. The non-transitory computer-readable storage device of claim 13 wherein the transfer function $f(x)$ is:

$$f(x) = (\log_2(a_s \times x + b_s) + c_s) \times \log_2(g(m,s)) \times d_p + k_p, \quad (6)$$

where $a_s$, $b_s$, $c_s$, $d_p$, and $k_p$ are parameters, and the function g(m,s) is a function of the mantissa m and the exponent s.

17. The non-transitory computer-readable storage device of claim 13 wherein r=2, and m and s are integers greater than or equal to zero.

18. The non-transitory computer-readable storage device of claim 13 wherein said non-overlapped input intervals of the first dynamic range $R_{WDR}$ are partitioned based on at least the exponent s and a weighted combination D of a reference pixel intensity distribution and an input pixel intensity distribution:

$$D = \alpha \times D_{ref} + \beta \times D_{hist}, \quad (7)$$

where $\alpha$ and $\beta$ are weight factors and $\alpha+\beta=1$; $D_{ref}$ is the reference pixel intensity distribution; and $D_{hist}$ is the input pixel intensity distribution.

19. The non-transitory computer-readable storage device of claim 18 wherein r=2, and m and s are integers greater than or equal to zero; wherein D=D(s), $D_{ref}=D_{ref}(S)$, $D_{hist}=D_{hist}(s)$ are functions of s; wherein the first pixel intensity range $R_{WDR}$ is between zero and a maximum value $m_{MAX}$, and the second pixel intensity range $R_{LDR}$ is between zero and a maximum value $y_{MAX}$; wherein the transfer function $f(x)$ is:

$$f(x) = (\log_2(x+1)) \times \log_2\left(\frac{2 \times m}{m_{MAX}} + s + 2\right) \times d_p + k_p, \quad (8)$$

where $d_p$ and $k_p$ are parameters; and
wherein $d_p$ and $k_p$ are the solutions of functions:

$$f(p_{lowbound}) = y_{MAX} \times D(s), \quad (9)$$

$$f(p_{highbound}) = y_{MAX} \times D(s+1), \quad (10)$$

where $$p_{lowbound} = m_{MAX} \times 2^s, \quad (11)$$

$$p_{highbound} = m_{MAX} \times 2^{s+1} - 1. \quad (12)$$

20. The non-transitory computer-readable storage device of claim 13 wherein said instructions, when executed, further cause the processing structure to act for:
  establishing a plurality of WDR image classes; and
  establishing a plurality of transfer functions each for one of the plurality of WDR image classes;
  wherein said obtaining the transfer function $f(x)$ comprises:
  determining one of the plurality of WDR image classes for the input WDR image; and
  determining the transfer function $f(x)$ as one of the plurality of transfer functions based on the determined WDR image class.

\* \* \* \* \*